US011434138B2

(12) United States Patent
Dooley et al.

(10) Patent No.: US 11,434,138 B2
(45) Date of Patent: Sep. 6, 2022

(54) SYSTEM AND METHOD FOR MANUFACTURING HIGH PURITY SILICON

(71) Applicant: NORTHERN SILICON INC, Vancouver (CA)

(72) Inventors: Kevin Allan Dooley, Zurich (CA); Elwood A. Morris, Nanaimo (CA)

(73) Assignee: Kevin Allan Dooley Inc., Zurich (CA)

(*) Notice: Subject to any disclaimer, the term of this patent is extended or adjusted under 35 U.S.C. 154(b) by 262 days.

(21) Appl. No.: 16/759,620

(22) PCT Filed: Jul. 10, 2018

(86) PCT No.: PCT/CA2018/050840
§ 371 (c)(1),
(2) Date: Apr. 27, 2020

(87) PCT Pub. No.: WO2019/079879
PCT Pub. Date: May 2, 2019

(65) Prior Publication Data
US 2020/0308007 A1 Oct. 1, 2020

Related U.S. Application Data

(60) Provisional application No. 62/578,141, filed on Oct. 27, 2017.

(51) Int. Cl.
*C01B 33/023* (2006.01)
*B01J 3/00* (2006.01)

(52) U.S. Cl.
CPC ............. *C01B 33/023* (2013.01); *B01J 3/006* (2013.01); *C01P 2006/80* (2013.01)

(58) Field of Classification Search
None
See application file for complete search history.

(56) References Cited

U.S. PATENT DOCUMENTS 3,716,345 A 2/1973 Grabmaier
4,352,784 A 10/1982 Lin
(Continued)

FOREIGN PATENT DOCUMENTS

CN 1013772334 A 2/2009
CN 101837978 9/2010
(Continued)

OTHER PUBLICATIONS

Safarrian J.; Tangstad, M: "Vacuum Refining of Molten Silicon", Metallurgical and Metals Transactions B., vol. 43B Dec. 2012.
(Continued)

*Primary Examiner* — Colin W. Slifka
*Assistant Examiner* — Michael Forrest

(57) ABSTRACT

A system and a method for producing silicon from a $SiO_2$-containing material that includes solid $SiO_2$. The method uses a reaction vessel including a first section and a second section in fluid communication with said first section. The method includes: heating the $SiO_2$-containing material that includes the solid $SiO_2$ to a $SiO_2$-containing material that includes liquid $SiO_2$, at a sufficient temperature to convert the solid $SiO_2$ into the liquid $SiO_2$; converting, in the first section, the liquid $SiO_2$ into gaseous $SiO_2$ that flows to the second section by reducing the pressure in the reaction vessel to a subatmospheric pressure; and reducing, in the second section, the gaseous $SiO_2$ into liquid silicon using a reducing gas. The reducing of the pressure is performed over a continuous range of interim pressure(s) sufficient to evaporate contaminants from the $SiO_2$-containing material, and removing by vacuum, the one or more evaporated gaseous contaminants.

40 Claims, 27 Drawing Sheets

(56) References Cited

U.S. PATENT DOCUMENTS

| | | |
|---|---|---|
| 5,069,741 A | 12/1991 | Kida et al. |
| 5,096,685 A | 3/1992 | Funahashi et al. |
| 5,306,474 A | 4/1994 | Kida et al. |
| 5,900,055 A | 5/1999 | Nagai et al. |
| 6,395,249 B1 | 5/2002 | Kondo et al. |
| 6,887,448 B2 | 5/2005 | Block et al. |
| 2006/0105105 A1 | 5/2006 | Ibrahim et al. |
| 2010/0215562 A1 | 8/2010 | Sanchez et al. |
| 2010/2002953 | 12/2010 | Krass |
| 2011/0262339 A1* | 10/2011 | Rauleder ................ C01B 32/05 423/350 |
| 2013/0163967 A1 | 6/2013 | Lukin et al. |
| 2018/0237306 A1* | 8/2018 | Shahverdi ............. C01B 33/033 |

FOREIGN PATENT DOCUMENTS

| | | | |
|---|---|---|---|
| CN | 101837978 A * | 9/2010 | ........... C01B 33/023 |
| EP | 2215192 A2 | 8/2010 | |
| WO | 2017024378 | 2/2017 | |

OTHER PUBLICATIONS

International Search Report and Written Opinion issued in Corrresponding PCT Application PCT/CA2018/050840 dated Sep. 19, 2018.
English Translation of D2 CN 101372334 A1 Feb. 25, 2009.

* cited by examiner

SYSTEM AND METHOD FOR MANUFACTURING HIGH PURITY SILICON

CROSS REFERENCE TO RELATED APPLICATION(S)

This application is a U.S. nationalization under 35 U.S.C. § 371 of International Application No. PCT/CA2018/050359 filed Mar. 23, 2018 entitled A SYSTEM AND METHOD FOR MANUFACTURING HIGH PURITY SILICON, which claims the benefit of priority to U.S. Provisional Patent Application No. 62/578,141 filed Oct. 27, 2010 entitled A SYSTEM AND METHOD FOR MANUFACTURING HIGH PURITY SOLAR GRADE SILICON (SOG SI), all the contents of which are herein incorporated by reference into the below DETAILED DESCRIPTION OF EXAMPLE EMBODIMENTS.

TECHNICAL FIELD

Example embodiments relate to a system and a method for producing high purity silicon, for example for use as high purity solar grade silicon (SOG SI).

BACKGROUND

The manufacturing of solar panels and solar cells requires silicon metal of high purity so that it can be used in the manufacture of polycrystalline silicon (or polysilicon or poly-Si). Generally, silicon metal is manufactured using a carbo-thermic reaction between carbon or coke and silica or quartz in vacuum arc furnaces or in direct arc furnaces. Such systems and methods are exemplified in PCT publication WO 2017/024378 to Pyrogenesis Canada Inc. filed Aug. 8, 2016, which is hereby incorporated by reference in its entirety.

Known systems and methods require an initial reactive heating process of feed materials comprising both silica or quartz ($SiO_2$) and a carbon-based reducing agent such as carbon (C) in some form (e.g., graphite, carbon black, coke, etc.).

The heating of feed materials, including a mixture of silica sand or quartz granules and the carbon-based reducing agent (e.g. carbon granules), is typically performed in a crucible where the feed materials are reactively heated by a direct carbon arc system using one or more electrodes arcing through the feed materials (e.g., submerged arc). Reactive heating means that heat is applied to the mixture of silica sand or quartz granules and some form of carbon. There is a chemical reaction with the carbon-based reducing agent (e.g. carbon granules) such that silica can be reduced into a Si product.

The high temperature reaction between the carbon and the silica or quartz ($SiO_2$) in the crucible results in Si and CO or $CO_2$ as well as many other possible compounds being produced. The desired liquid silicon metal and many undesirable compounds will drain to the bottom of the crucible. Some of these undesirable compounds include various metallic and other elements that are originally a part of the feed materials and in some cases and under specific conditions some of these elements/compounds can be evaporated. Furthermore, some of the carbon itself, which was a reactant, can also remain in the produced material as undesirable silicon-carbon compounds (SiC). The molten silicon collected in the bottom of the crucible is tapped off or drained periodically.

Known systems and methods of producing silicon metal using a carbo-thermic reaction between carbon or coke and silica or quartz in vacuum arc furnaces or in direct arc furnaces will produce, as a primary byproduct, various greenhouse gases such as carbon dioxide gas ($CO_2$) or carbon monoxide gas (CO) from the furnace. Therefore, the known carbo-thermic reactions used to manufacture silicon are not very green or environmentally friendly.

If the silicon produced in such a process is to be used for solar panel applications, where a purity of level of at least 99.999% Si (i.e. 5N) may be a minimal requirement, then the tapped off liquid silicon metal requires further refinement or upgrading to remove various contaminants.

Some conventional processes and schemes are used for the upgrading of silicon metal produced by the carbo-thermic processes to increase the purity of the silicon metal so that it can be used in the manufacture of polycrystalline silicon (or polysilicon or poly-Si) used for solar panel manufacture. While the basic carbo-thermic processes can produce 98.5% to 99.5% Si, these purity levels, however, depend significantly on the level of purity of the feed materials being at or above 99.9%. Moreover, it would be understood by those skilled in the art that polysilicon requires very high silicon purity but it is also a requirement to provide for particularly low levels of boron (B), phosphorous (P), copper (Cu), titanium (Ti), iron (Fe) and aluminum (Al), which are contaminants commonly found in the feed materials (quartz and carbon).

Research and development efforts, with the target of upgrading of metal grade silicon metal to solar grade silicon metal have been ongoing since the 1980's. The higher the purity of the silicon produced, the greater the value.

Vacuum refinement of molten metal grade silicon is one process that has been used to attempt to evaporate impurities out of the molten silicon metal. This has been implemented both in the reaction furnace and after the molten silicon is removed from the reaction furnace where treatment is performed in ladles of molten silicon by exposing them to a vacuum while in a molten state. This process has limited effectiveness when the depth of the molten silicon is more than a few millimeters because of hydrostatic pressure effects resulting in relatively high pressures at depths beyond a few millimeters in the molten silicon, requiring extensive vertical stirring of the liquid for surface exposure of the contaminants.

Other separate processes may be required to remove boron, titanium and possibly other contaminants, which have very low vapor pressures at the temperature of molten silicon. And in fact boron and titanium have vapor pressures below that of molten silicon, making removal of these important contaminants difficult using vacuum refinement alone. These and other contaminants are generally in the feed materials at various concentrations. Some contaminants can be removed to yield a more pure feed material. However, this adds steps and increases the overall cost.

Therefore, the existing process for manufacturing silicon metal requires reactive heating and results in silicon products that may include many contaminants. The contaminants make it not suitable in its produced state for high purity solid state types of applications like solar cells, without additional significant refinement thereafter. These refinement methods may be undesirable because, among other things, they add additional time and resource consuming steps and often use chemicals which have an adverse environmental impact.

SUMMARY

In an example embodiment, there is provided a system and a method for producing high purity silicon from a material comprising silica. The high purity silicon can be used for solar panels and solar cells, in one example.

According to an aspect, there is provided a method for producing silicon from a silicon dioxide ($SiO_2$)-containing material that includes solid $SiO_2$ using a reaction vessel, the reaction vessel comprising a first section and a second section in fluid communication with said first section, the method comprising:
heating the $SiO_2$-containing material that includes the solid $SiO_2$ to a $SiO_2$-containing material that includes liquid $SiO_2$, at a sufficient temperature to convert the solid $SiO_2$ into the liquid $SiO_2$;
converting, in the first section, the liquid $SiO_2$ into gaseous $SiO_2$ that flows to the second section by reducing the pressure in the reaction vessel to a subatmospheric pressure; and
reducing, in the second section, the gaseous $SiO_2$ into liquid silicon.

According to an aspect, the heating of the $SiO_2$-containing material that contains the solid $SiO_2$ is performed in another section, the method further comprising:
receiving, in the first section, the $SiO_2$-containing material that contains the liquid $SiO_2$ from the another section.

According to an aspect, the heating of the $SiO_2$-containing material that contains the solid $SiO_2$ is performed in the first section.

According to an aspect, the heating of the $SiO_2$-containing material that includes the solid $SiO_2$ is done in the presence of an inert gas. According to an aspect, the inert gas is Argon (Ar).

According to an aspect, the reducing of the pressure to the subatmospheric pressure is performed over a continuous range of one or more interim pressures sufficient to evaporate one or more contaminants from the $SiO_2$-containing material that contains the liquid $SiO_2$ to one or more gaseous contaminants, the method further comprising:
removing, by vacuum, the one or more gaseous contaminants evaporated from the $SiO_2$-containing material that contains the liquid $SiO_2$ due to the one or more interim pressures, prior to the pressure reaching the subatmospheric pressure that converts the liquid $SiO_2$ into the gaseous $SiO_2$.

According to an aspect, one or more gaseous contaminants is phosphorous (P), zinc (Zn), sodium (Na), calcium (Ca), antimony (Sb), lead (Pb), indium (In), manganese (Mg), or gallium (Ga), or combinations thereof.

According to an aspect, the method further comprising:
removing, after the converting to the gaseous $SiO_2$, one or more un-evaporated contaminants remaining in the first section.

According to an aspect, the one or more un-evaporated contaminants is aluminum (Al), tin (Sn), copper (Cu), iron (Fe), titanium (Ti), or boron (B), or combinations thereof.

According to an aspect, the sufficient temperature is above the melting point and below the boiling point of $SiO_2$ at atmospheric pressure.

According to an aspect, the sufficient temperature is from about 1983K to about 2500K. According to another aspect, the sufficient temperature is on or about 2100K.

According to an aspect, at least one vane in the second section induces a circumferential flow of gases in the second section so as to cause an extension of residency time of said reducing the gaseous $SiO_2$ into the liquid silicon.

According to an aspect, the reaction vessel further includes a heat recuperation chamber operably connected to the second section, and wherein the method further comprises:
drawing one or more gases including the gaseous byproduct from the second section into the heat recuperation chamber, wherein heat stored in the drawn gases is directed to the $SiO_2$-containing material that includes the solid $SiO_2$ for said heating of the $SiO_2$-containing material that includes the solid $SiO_2$.

According to an aspect, the gaseous byproduct is $H_2O$ vapor.

According to an aspect, the reaction vessel further comprises a heating vessel to provide direct heat energy from a heated gas contained therein to heat the $SiO_2$-containing material containing the solid $SiO_2$.

According to an aspect, the heating vessel comprises:
one or more inlets for receiving a fuel and an oxidant for a combustion reaction in the heating vessel; and
one or more outlets for removing combustion products from the heating vessel.

According to an aspect, the fuel is hydrogen ($H_2$) and the oxidant is air or oxygen ($O_2$).

According to an aspect, the method further comprising:
heating any liquid $SiO_2$ that may have condensed in the second section to a second temperature to convert the liquid $SiO_2$ back into re-evaporated gaseous $SiO_2$, wherein the second temperature is greater than the sufficient temperature; and
reducing, in the second section, the re-evaporated gaseous $SiO_2$ into the liquid silicon.

According to an aspect, the method further comprising:
heating any SiO that has been formed in the second section to a temperature to convert the SiO into gaseous SiO; and
reducing, in the second section, the gaseous SiO into the liquid silicon and/or
removing, by vacuum, any unreacted gaseous SiO from the second section.

According to an aspect, the method further comprising:
directing a gas into contents collected in the second section to promote evaporation of the contents.

According to an aspect, the gas is inert gas, carbon monoxide (CO) or hydrogen ($H_2$).

According to an aspect, the reducing of the gaseous $SiO_2$ into the liquid silicon is done with a process gas or plasma.

According to an aspect, the temperature of the process gas or plasma is less than the temperature of the gaseous $SiO_2$.

According to an aspect, the temperature of the process gas or plasma is on or about 300K.

According to an aspect, the process gas or plasma is carbon monoxide (CO). According to an aspect, the process gas or plasma is hydrogen ($H_2$).

According to an aspect, the amount of hydrogen ($H_2$) is greater than stoichiometric value. According to an aspect, the amount of hydrogen ($H_2$) is at least about 7 times stoichiometric value.

According to an aspect, the heating the $SiO_2$-containing material that includes the solid $SiO_2$ is performed at atmospheric pressure or greater than atmospheric pressure.

According to an aspect, the heating of the $SiO_2$-containing material that includes the solid $SiO_2$ is a non-reactive heating. According to an aspect, the non-reactive heating is facilitated by evacuating gas contaminants surrounding of the $SiO_2$-containing material by vacuum. According to an aspect, the heating of the $SiO_2$-containing material that includes the solid $SiO_2$ is performed in the absence of carbon (C) or carbon based gas.

According to an aspect, the $SiO_2$-containing material that includes the solid $SiO_2$ further includes one or more contaminants.

According to an aspect, the reducing of the pressure is performed in the first section at the sufficient temperature.

According to an aspect, the reducing, in the second section, is done at the subatmospheric pressure. According to an aspect, the subatmospheric pressure is from about 3500 Pa to about 4000 Pa. According to an aspect, the subatmospheric pressure is on or about 3500 Pa.

According to an aspect, the method further comprising drawing heat away from the second section and directing the heat towards the first section.

According to an aspect, the first section and the second section are in a co-axial arrangement, wherein the second section substantially surrounds the first section. According to an aspect, the first section is arranged substantially over the second section.

According to an aspect there is provided a system for producing silicon from a silicon dioxide ($SiO_2$)-containing material that includes solid $SiO_2$, the system comprising:
- a heat source for heating the $SiO_2$-containing material that includes solid $SiO_2$ to a $SiO_2$-containing material that includes liquid $SiO_2$, at a sufficient temperature to convert the solid $SiO_2$ into the liquid $SiO_2$;
- a reaction vessel comprising a first section and a second section in fluid communication with said first section, said first section for containing the $SiO_2$-containing material that includes liquid $SiO_2$;
- a vacuum source for reducing the pressure to a subatmospheric pressure for converting, in the first section, the liquid $SiO_2$ into gaseous $SiO_2$ that flows to the second section;
- wherein the second section is for reducing of the gaseous $SiO_2$ into liquid silicon in the second section.

According to an aspect, the system further comprising at least one gas inlet to facilitate the reducing of the gaseous $SiO_2$ into the liquid silicon in the second section by introducing an amount of a process gas. According to an aspect, the amount of the process gas is at least about 7 times stoichiometric value. According to an aspect, the at least one gas inlet is configured to introduce the process gas into a region where the gaseous $SiO_2$ enters the second section.

According to an aspect, the vacuum source is configured to reduce the pressure to the subatmospheric pressure over a continuous range of one or more interim pressures sufficient to evaporate one or more contaminants from the $SiO_2$-containing material that contains the liquid $SiO_2$ to one or more gaseous contaminants, prior to the pressure reaching the subatmospheric pressure that converts the liquid $SiO_2$ into the gaseous $SiO_2$.

According to an aspect, the system further comprising at least one gas outlet to remove the one or more gaseous contaminants evaporated from the $SiO_2$-containing material that includes the liquid $SiO_2$. According to an aspect, the at least one gas outlet is positioned above the first section. According to an aspect, the at least one gas outlet comprises a pipe that stems from a tangential perimeter of the first section. According to an aspect, the pipe penetrates through the second section.

According to an aspect, the second section further comprises at least one vane for inducing a circumferential flow of gases in the second section so as to allow for an amount of time to reduce the gaseous $SiO_2$ into liquid silicon. According to an aspect, a plurality of vanes extend from the wall of the second section and are configured so as to form a helical pathway for directing flow of gases therein.

According to an aspect, a ratio of the vapor flow area for gases proximal the second section to the vapor flow area for gases proximal the first section is on or about 70:1.

According to an aspect, the heat source comprises a heat recuperation chamber configured between the first section and the second section, wherein heat from the gases in the heat recuperation chamber can be directed towards the first section. According to an aspect, the heat recuperation chamber further comprises at least one vane for inducing a circumferential flow of gases in the heat recuperation chamber so as to allow for an amount of time to reduce the gaseous $SiO_2$ into liquid silicon. According to an aspect, a plurality of vanes extend from the wall of the heat recuperation chamber and are configured so as to form a helical pathway for the movement of gases therein.

According to an aspect, the system further comprising one or more channels formed in a wall between the first section and the second section, the one or more channels dimensioned to allow the gaseous $SiO_2$ formed in the first section to move into the second section. According to an aspect, the one or more channels have an interior diameter which increases in the direction moving towards the second section from the first section such that a vapor flow area for gases proximal the second section is greater than a vapor flow area for gas proximal the first section in order to accommodate expansion of the gases moving from the first section to the second section through the one or more channels.

According to an aspect, the system further comprising a channel formed in a wall between the first section and the second section, the channel is dimensioned to allow the gaseous $SiO_2$ formed in the first section to move into the second section. According to an aspect, the channel is an annular channel configured to allow unobstructed outward radial flow of gaseous $SiO_2$ from the first section to the second section.

According to an aspect, the wall comprises a first section facing side and a second section facing side, the second section facing side including a slope, wherein the annular channel has an interior diameter which increases in the direction moving from the first section facing side to the second section facing side such that a vapor flow area for gases proximal the second section is greater than a vapor flow area for gas proximal the first section in order to accommodate expansion of the gases moving from the first section to the second section through the annular channel.

According to an aspect, the at least one gas inlet comprises a gas chamber configured above the second section, the gas chamber defining an array of holes configured to direct the process gas downwards and into the second section. According to an aspect, the gas chamber is substantially circular.

According to an aspect, the heat source comprises a heating vessel configured to direct heat energy from a heated gas contained therein towards the first section to heat the $SiO_2$-containing material in the first section.

According to an aspect, the heating vessel comprises:
- one or more inlets for receiving a fuel and an oxidant for a combustion reaction in the heating vessel; and
- one or more outlets for removing combustion products from the heating vessel.

According to an aspect, the fuel is hydrogen ($H_2$) and the oxidant is air or oxygen ($O_2$).

According to an aspect, the system further comprising an electrode for delivering an ionizing current into a region where the process gas enters the second section.

According to an aspect, the system further comprising an evaporation element to promote evaporation of contents in the first and/or second sections. According to an aspect, the evaporation element is one or more injection ports for introducing a gas directly into the contents of the first and/or second sections. According to an aspect, the gas is inert gas, carbon monoxide (CO) or hydrogen ($H_2$).

BRIEF DESCRIPTION OF THE DRAWINGS

Reference will now be made, by way of example, to the accompanying drawings that show example embodiments, in which.

Similar reference numerals may be used in different figures to denote similar components.

DETAILED DESCRIPTION OF EXAMPLE EMBODIMENTS

Figure 1:
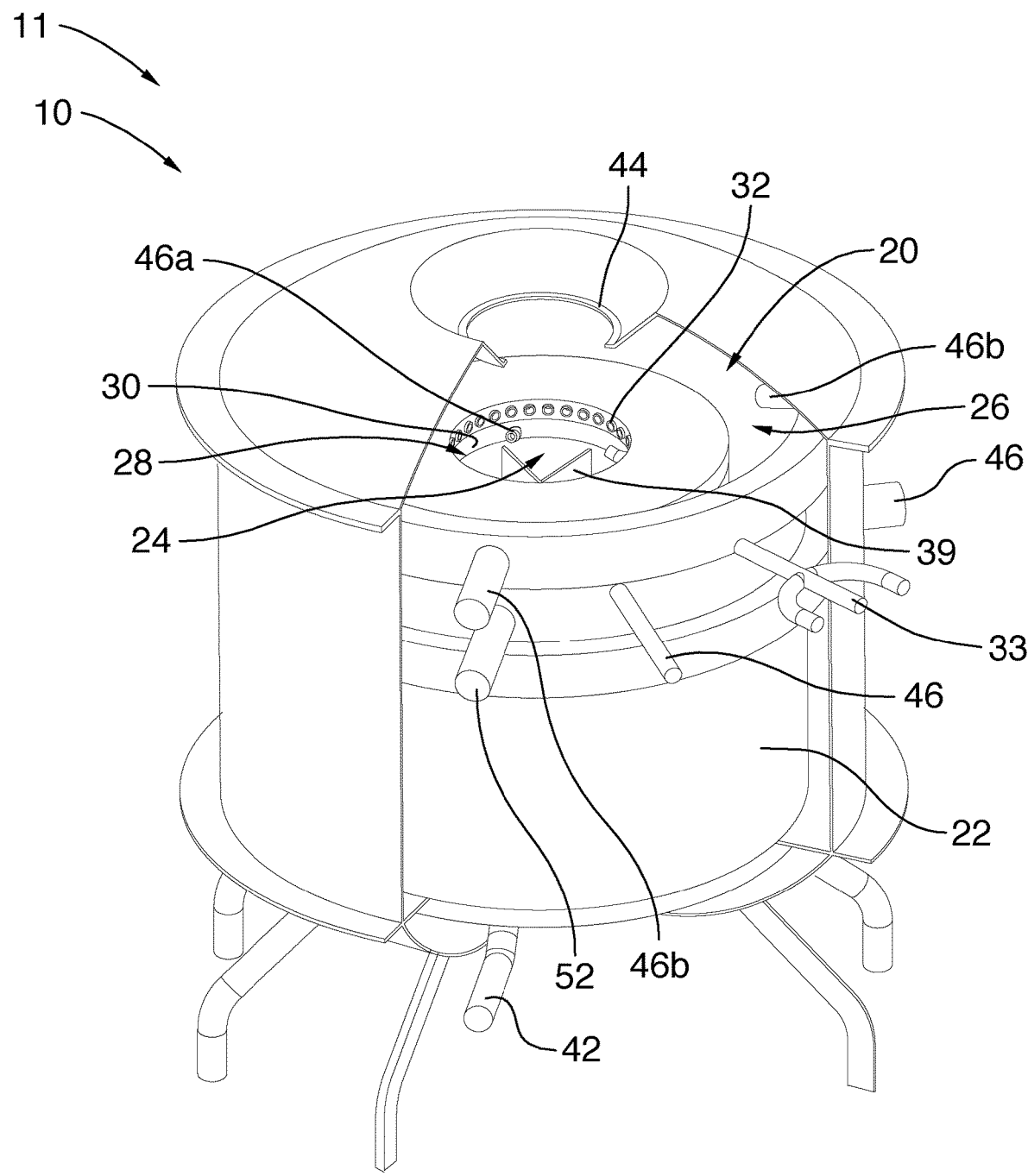
FIG. 1 is a perspective view of system, including a vacuum furnace with a portion of the sidewall and top wall removed exposing a reaction vessel, according to an example embodiment.
Figure 2:
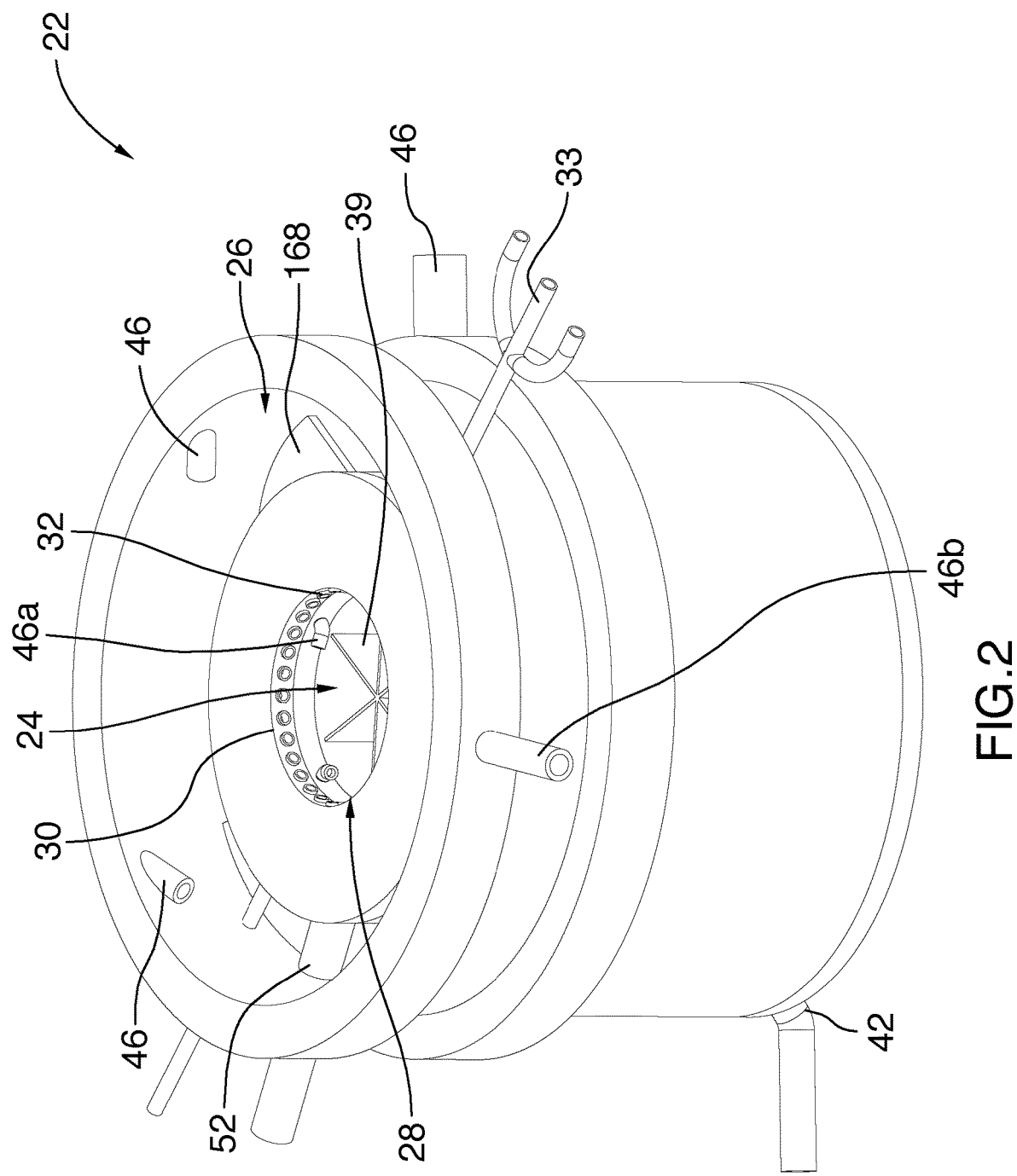
FIG. 2 is a perspective view of the reaction vessel of FIG. 1 according to an example embodiment.
Figure 3:
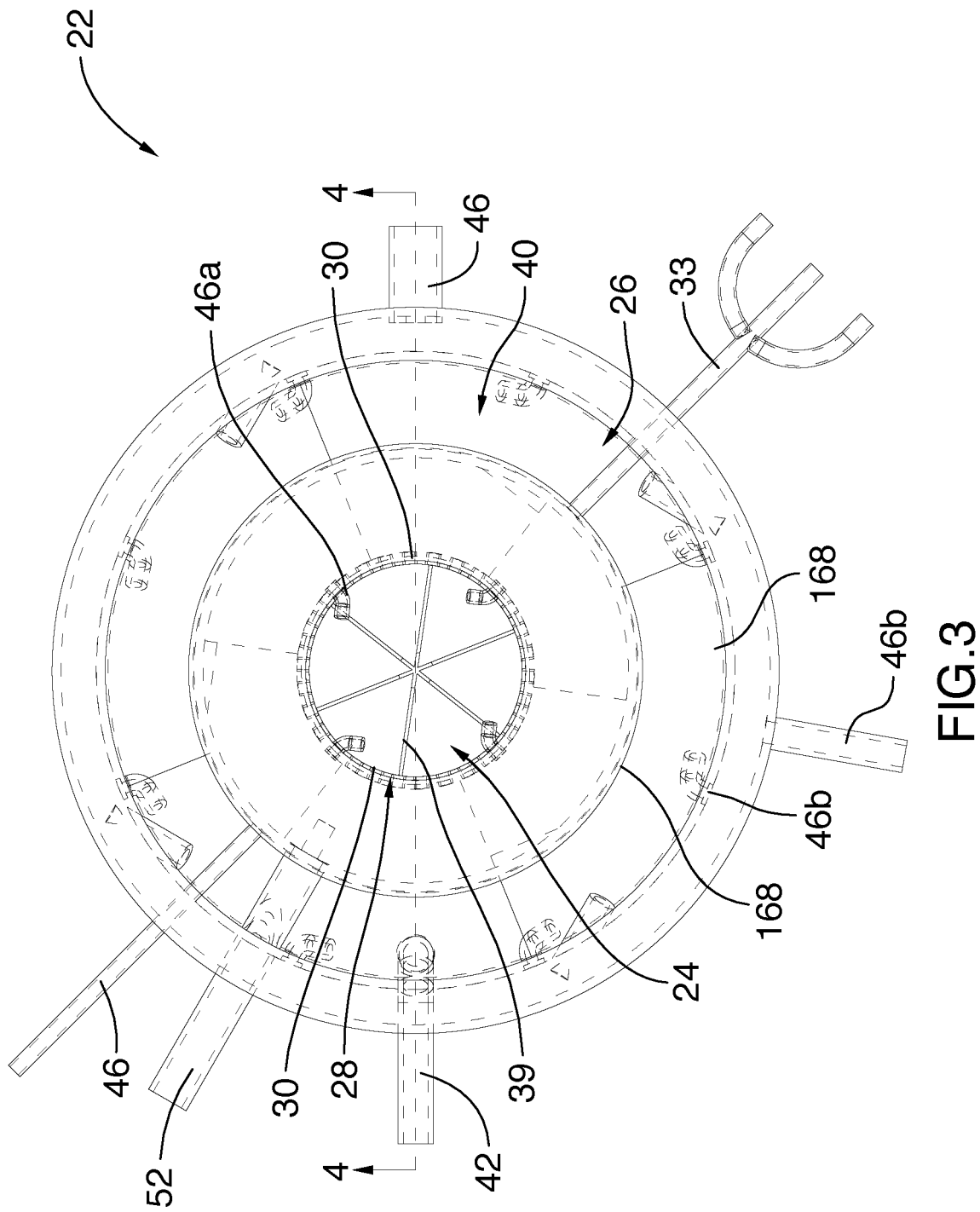
FIG. 3 is a top view of the reaction vessel of FIG. 2.

Reference will be made below in detail to exemplary embodiments, examples of which are illustrated in the accompanying drawings.

With reference to FIGS. 1 to 10, an example embodiment of a system 11 for producing silicon from a silica-containing material 12 is shown. The silica in the silica-containing material 12 can be in the form of $SiO_2$ or silicon dioxide. The silica-containing material 12 can include silica, quartz, quartzite or any other forms with high silica content (generally >90%). The silica-containing material 12 can include solid $SiO_2$ and/or liquid $SiO_2$ and can also include one or more other non-silicon dioxide solids and liquids.

The system 11 according to example embodiments, in general terms, includes a vacuum furnace 10 that is configured to receive silica-containing material 12 that includes a solid $SiO_2$ and/or a liquid $SiO_2$, non-reactively heat the silica-containing material 12 at a temperature sufficient to convert the solid $SiO_2$ to liquid $SiO_2$ 14, evaporate the liquid $SiO_2$ 14 into gaseous $SiO_2$ 16, and reduce the gaseous $SiO_2$ 16 into silicon 18. Non-reactively heating means that the heating of the silica-containing material 12 is done in the absence of reducing agents, such as for example, carbon-based reducing agents.

Vacuum furnace 10 can have a substantially cylindrical shape with a domed top, a bottom, and a sidewall. The domed top, the bottom and the sidewall define a chamber 20 of the vacuum furnace 10. Disposed within the chamber 20 is a reaction vessel 22 having a first section 24 and a second section 26.

The first and second sections 24, 26 are in fluid connection with each other such that one or more gases which are evaporated and allowed to flow over the top of the separating walls from the first section 24 into the second section 26. The first and second sections 24, 26 may also be in thermal connection wherein heat released by a reaction in the second section 26 may be conducted via the thermally common walls of the first and second section 24, 26 into the first section 24.

In one embodiment, the first section 24 is an evaporation section used to receive silica-containing material 12, non-reactively heat the silica-containing material 12 to convert solid $SiO_2$ contained therein into liquid $SiO_2$ 14, and evaporate the liquid $SiO_2$ 14 into gaseous $SiO_2$ 16. As discussed above, the first section 24 can also be used to receive the $SiO_2$-containing material 12 that contains the liquid $SiO_2$ from a separate supply section (not shown) into the first section 24, and therefore, the first section 24 is used to maintain the $SiO_2$ in a liquid form by non-reactively heating. In such an example, the separate supply section can also be configured to non-reactively heat the $SiO_2$-containing material 12 that contains the solid $SiO_2$ to convert the solid $SiO_2$ into liquid $SiO_2$ which is then delivered to the first section 24.

The second section 26 is a reduction reaction section that is used to reduce the gaseous $SiO_2$ 16 into silicon 18. During the evaporation step, in addition to the produced gaseous $SiO_2$ 16, there may be the production of various gases such as SiO, $O_2$, and other gases comprising various contaminants which will be discussed in greater detail below.

As depicted in FIGS. 1 to 9, first section 24 comprises an opening 28 used to receive the silica-containing material 12 to be treated. The same opening 28 can also serve as an exhaust port 30 configured to allow gaseous $SiO_2$ 16 evaporated from the silica-containing material 12 to move away from the first section 24. In other embodiments, first section 24 includes opening 28 used to receive the silica-containing material 12 and a separate $SiO_2$ gas exhaust port (not shown) configured to allow gaseous $SiO_2$ 16 evaporated from the silica-containing material 12 to move away from the first section 24.

First section 24 can also include at least one first section vacuum outlet 32 operably connected to a vacuum source (not shown) for removing one or more gases. The first section vacuum outlet 32 can be formed in the wall of the first section 24, above (or slightly above) the melt level of liquid contained in the first section 24. The melt level or a melt depth is the level in the first section 24 at which the melted liquid in the first section 24 rises to. The first section vacuum outlet 32 is configured for removing higher vapor pressure contaminants 34 evaporated from the silica-containing material 12 at one or more interim pressures higher than the pressure at which the $SiO_2$ would begin to evaporate. Evaporation and removal of the higher vapor pressure contaminants 34 prevents these higher vapor pressure gases from reaching the second section 26, as discussed in greater detail herein below. In some embodiments, the higher vapor pressure contaminants 34 that are removed via the first section vacuum outlet 32 are subjected to heat to prevent condensation of the evacuated gaseous contaminants 34 inside the piping of the first section vacuum outlet 32.

In an example embodiment, the plurality of first section vacuum outlets 32 can feed higher vapor pressure contaminants 34 into a common manifold 35 situated along the perimeter of the first section 24. The manifold 35 can direct the higher vapor pressure contaminants 34 towards at least one splitter 33 configured for separating the expelled higher vapor pressure contaminants 34. As shown in FIG. 1, the splitter 33 comprises three branches, and each one branch used to divert a specific one of the higher vapor pressure contaminant 34 for collection and/or use in any other processes, as required, using one or more controllable valves (not shown). Splitter 33 may comprise at least three branches or any number of branches as necessary. As will be discussed in greater detail below, this is possible because each higher vapor pressure contaminant 34 may be expelled at different pressures and during different times. Some higher vapor pressure contaminants 34 include for example, P, Zn, Na, Ca, Bi, Pb, In, Mg, and Ga and are disclosed in Safarian J and Tangstad M, "Vacuum Refining of Molten Silicon", *Metallurgical and Materials Transactions B*, December 2012, Vol 43B, pages 1427 to 1445, which is hereby incorporated by reference in its entirety.

The first section vacuum outlet 32 can also be configured to control the pressure in the chamber 20 of the vacuum furnace 10, for example, either to maintain the atmospheric pressure or to gradually reduce pressure to a subatmospheric pressure, or to achieve one or more interim pressures, as will be discussed in detail below.

First section vacuum outlet 32 can also be used to create a vacuum (using the vacuum source) in the vacuum furnace 10 before any non-reactive heating, evaporation, and/or reducing steps take place to remove any gases which may be undesirable and to facilitate the non-reactive heating, evaporation, and/or reducing steps. For example, the first section vacuum outlet 32 can be used to generate a vacuum to remove any $H_2$, $O_2$, CO, or $CO_2$ which may be in the vacuum furnace 10 prior to the non-reactive heating and evaporation step.

First section 24 also includes a drain 36 for removing remaining contaminants 38 from the silica-containing material 12 that may remain after the evaporation of the majority of the liquid $SiO_2$ 14 and higher vapor pressure contaminants 34 from the silica-containing material 12 are removed via the first section vacuum outlet 32. As will be discussed in detail below, some of these contaminants 38 include, for example, B, Al, Sn, Cu, Fe, and Ti and may include any other contaminants that may also be present in the silica-containing material 12.

In an example embodiment, first section 24 also includes one or more heating blades 39 that provide heat in order to promote evaporation of material from the first section 24.

First section 24 can be dimensioned to have a relatively high ratio of surface area to melt depth to prevent having relatively high hydrostatic pressures of the liquid at the bottom of the first section 24. The relatively high ratio of surface area to melt depth promotes evaporation because it allows the bottom of the liquid to be exposed to lower pressures than would be possible for a deep melt.

Second section 26 comprises an opening 40 configured to receive the gaseous $SiO_2$ 16 evaporated from the silica-containing material 12 in the first section 24 and to reduce gaseous $SiO_2$ 16 into silicon 18 product. A silicon product tap 42 can be provided for removing the Si 18 product from the second section 26.

In one embodiment, shown in FIGS. 1 to 9, the first and second sections 24, 26 are concentrically arranged. In such an embodiment, the first section 24 is substantially cylindrical and forms an inner crucible and the second section 26 is substantially cylindrical and forms an outer crucible wherein the outer crucible is bounded by its own exterior facing wall and the inner crucible's exterior facing wall. The outer crucible is in fluid and thermal communication with said inner crucible and surrounds a perimeter of said inner crucible. However, the shape, structure, orientation and material of construction of the reaction vessel 22 disclosed herein is not particularly limited and can vary depending upon the design and application requirements. One exemplary material of the construction of the reaction vessel 22 is tungsten.

Vacuum furnace 10 can comprise one or more re-charge ports 44 for feeding the solid and/or liquid silica-containing material 12 into the first section 24 through opening 30. Re-charge ports 44 can be formed in the domed top of the vacuum furnace 10 and may include a moveable lid (not shown) for reversibly and selectively sealing the vacuum furnace 10. In some embodiments, re-charge ports 44 may be operatively connected to silica-containing material feed system comprising a sealed hopper (not shown) for dispensing the silica-containing material 12, as required, during the operation of the vacuum furnace 10. Re-charge ports 44 may be operatively connected to an external liquid $SiO_2$-containing material reservoir and/or an external furnace for melting solid $SiO_2$-containing material (not shown) and be configured to deliver the liquid $SiO_2$-containing material into the first section 24.

Vacuum furnace 10 can comprise one or more gas inlets 46 for introducing gases into the first and/or second sections 24, 26. According to an embodiment, a plurality of inlets 46 can direct the same or various different gases into the first and/or second sections 24, 26 at either the same time or at different times during the method for producing Si 18 from silica-containing material 12, as detailed below. Gas inlet 46 can penetrate the sidewall of the first and/or second sections at an angle normal to the sidewall or at an angle less than 90 degrees to the sidewall. Additionally, in an example embodiment, gas inlet 46 can also be angled in any upward or downward direction, and in some embodiments, gas inlet 46 can direct the stream of gas downward and towards the bottom of the vacuum furnace 10.

The gases which can be introduced by the one or more gas inlet 46 can be, in one embodiment, inert gas 48. Inert gas 48 will remove any air that may be present and reduces, if not eliminates, humidity and other possible contaminants in the air. An example of a suitable inert gas 48 is argon (Ar) gas. Further, the gases which can be introduced by the one or more gas inlets 46 can be, in one embodiment, process gas 50 such as hydrogen ($H_2$) or carbon monoxide (CO) for which purpose as will be explained in greater detail below.

As shown in FIGS. 1 to 9, inert gas 48 can be introduced directly into the first section 24 through a plurality of gas inlets 46a situated along a perimeter of the first section 24. Each of the plurality of gas inlets 46a can be angled to direct the stream of inert gas 48 upward and towards the top of the first section 24. The introduction of the inert gas 48 in the first section 24 can promote the vaporization process and can facilitate the movement of gaseous $SiO_2$ from the first section 24 where the evaporation is carried out towards the second section 26 where the reduction reactions are carried out.

Inert gas 48 can also be introduced directly into the second section 26 through a plurality of gas inlets 46b situated along a perimeter of the second section 26. Each of the plurality of gas inlets 46b can be angled to direct the stream of inert gas 48 downward and towards the bottom of the second section 26.

In one embodiment, the entire reaction vessel 22 (including both the first and second sections 24, 26) is flushed with inert gas 48 through inlets 46a and/or 46b during a heating cycle and/or before a heating cycle, while the temperature is still relatively low to prevent any unintended reactions. The pressure of the inert gas 48 can be at, below or above standard pressure.

As shown in the FIGS. 1 to 9, process gas 50 can be introduced directly into the second section 26 through at least one of a plurality of gas inlets 46b situated along a perimeter of the second section 26. In one embodiment, the plurality of gas inlets 46b generally form an acute angle with respect to the sidewall and are angled downward and towards the bottom of the second section 26. This specific arrangement of gas inlets 46b will cause the introduced stream of process gas 50 to move in a vortex-like spin in the second section 26. As will be explained in further detail below, the vortex-like spin of gases in the second section 26 may be advantageous, at least because, it: (1) can increase the time available for the reduction reactions; (2) can increase heat exchange between first section 24 and second section 26; and (3) can facilitate the separation of liquid silicon 18 product from lower density gases (for example, due to the centrifugal effects) in the second section 26.

The same gas inlet 46b can also be used to introduce mixtures of inert gas 48 and process gas 50 depending on the particular stage of the method for producing Si 18 from silica-containing material 12. For example, in one embodiment, during the initial stages of the reduction reaction, the gas inlet 46b can introduce a stream of gas comprising inert gas 48 and process gas 50 and into the later stages of the reduction reaction, the same gas inlet 46b can begin to reduce the amount of inert gas 48 such that at some point, only process gas 50 is introduced into the second section 26.

Vacuum furnace 10 can comprise one or more second vacuum outlets 52 operably connected to a vacuum source (not shown) and are configured for removing one or more gaseous byproducts 54 that are produced when gaseous $SiO_2$ 16 is reduced into the Si 18 product in the second section 26. The one or more second vacuum outlets 52 are downstream of the reduction reactions to remove one or more gaseous byproducts 54 produced during the reduction reactions in the second section 26. According to some example embodiments, the one or more second vacuum outlets 52 may pierce the wall of the second section 26 at a location above the melt level.

According to some example embodiments, the second vacuum outlet 52 can also be used during the reaction phase of the process to control the pressure in the chamber 20 of the vacuum furnace 10 to maintain the pressure at around the boiling point of the $SiO_2$ melt. Similar to vacuum outlets 32, vacuum outlets 52 can also be used evacuate and create a vacuum within the vacuum furnace 10 to remove any undesirable gases prior to any steps of heating, evaporation, and reducing.

Vacuum furnace 10 comprises two or more heat sources 56 for directly heating the first and second sections 24, 26 of the reaction vessel 22. Heat sources can be, for example, high-frequency coil (e.g. induction heating) or resistance-heating heaters. In some embodiments, the heat sources can heat the first and second sections 24, 26 to the either same temperature or to different temperatures depending on the situation. In one embodiment, for example, the second section 26 is heated to a temperature equal to or greater than that of the first section 24 such to re-evaporate potentially unreacted $SiO_2$-related condensate that may happen to fall into the liquid silicon. In some examples, a heat exchanger (not shown) is used to transfer heat from the first section 24 to the second section 26 at the appropriate step.

Figure 4:
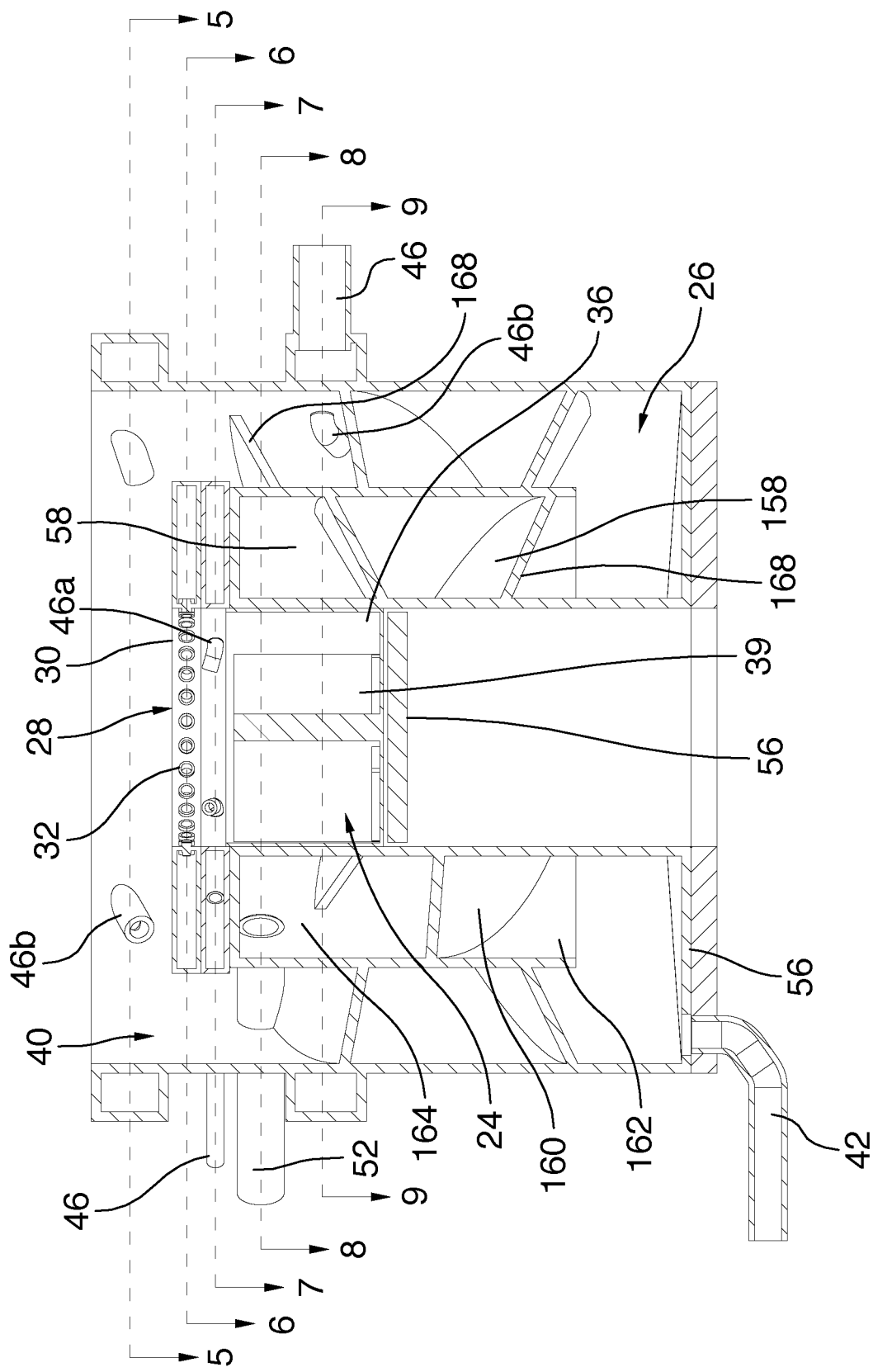
FIG. 4 is a cross sectional view along the line 4-4 of FIG. 3.
Figure 5:
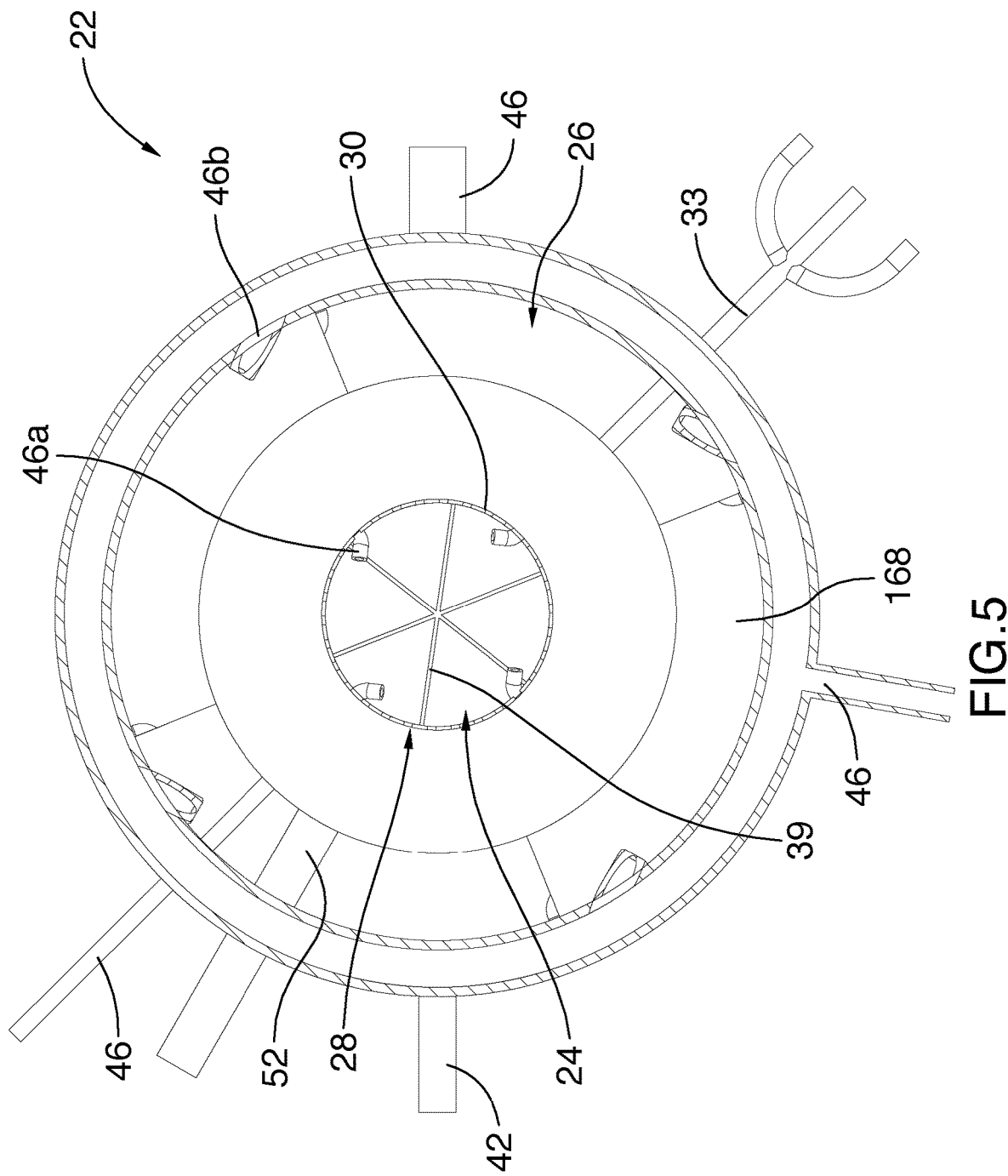
FIG. 5 is a cross sectional view along the line 5-5 of FIG. 4.
Figure 6:
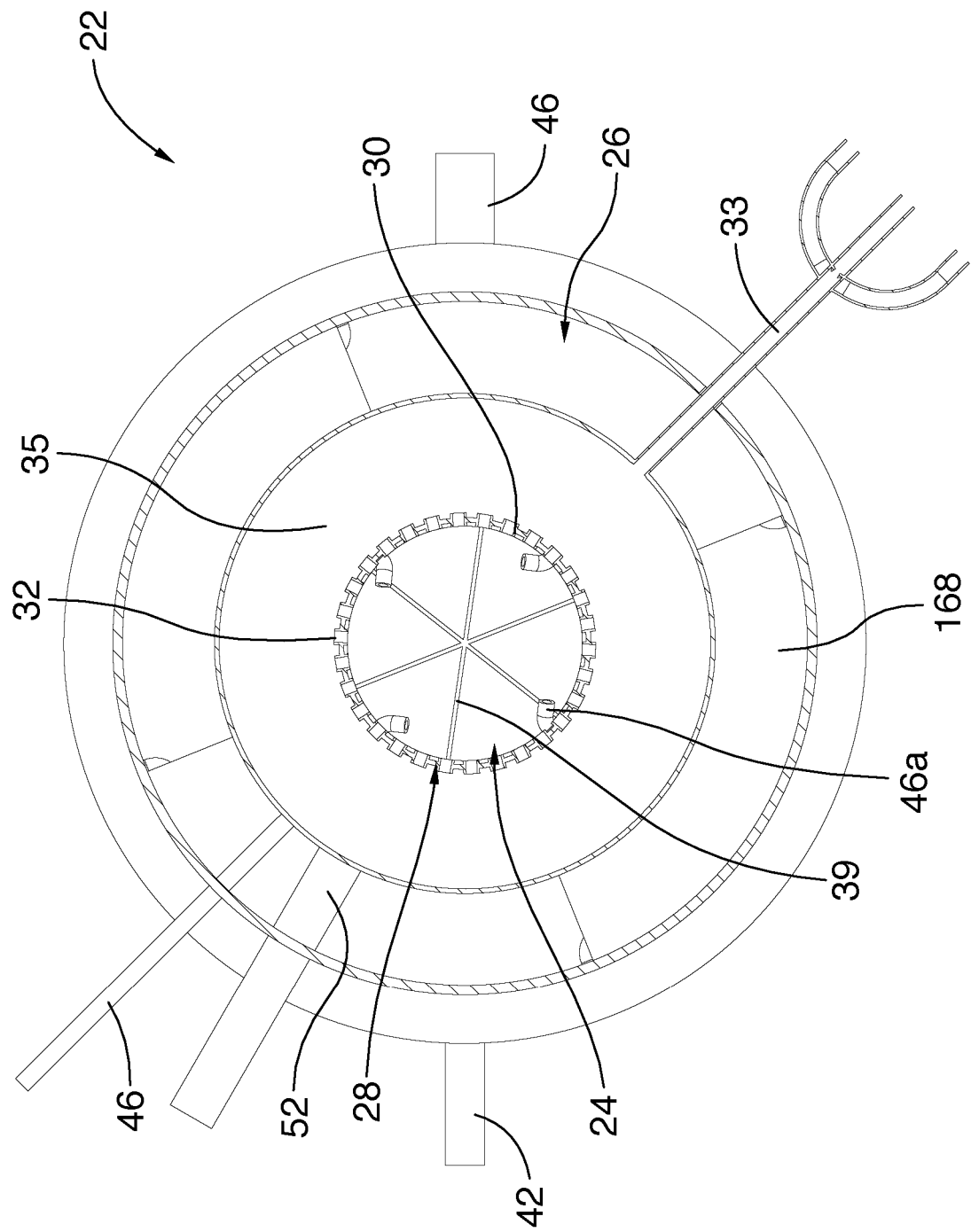
FIG. 6 is a cross sectional view along the line 6-6 of FIG. 4.
Figure 7:
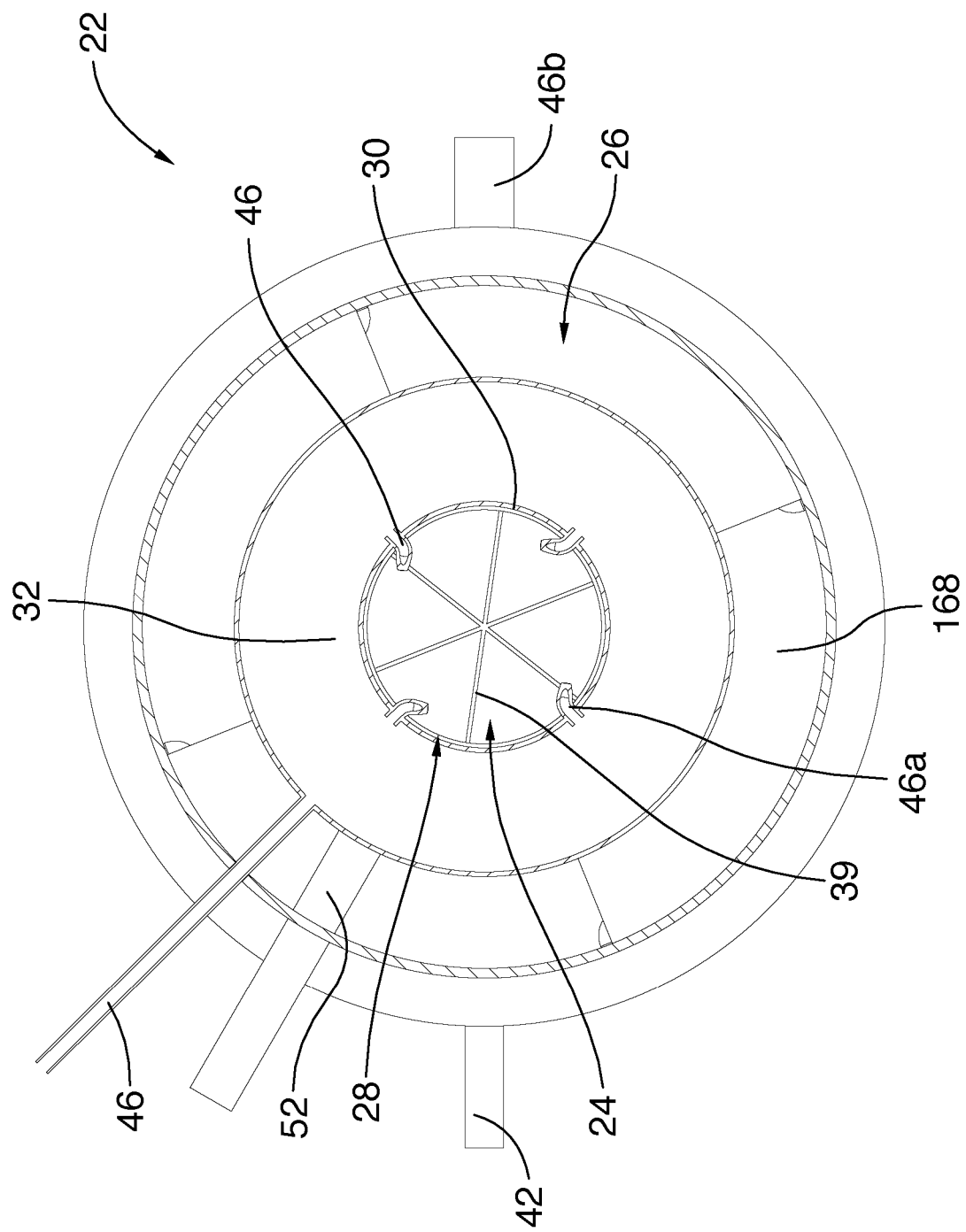
FIG. 7 is a cross sectional view along the line 7-7 of FIG. 4.
Figure 8:
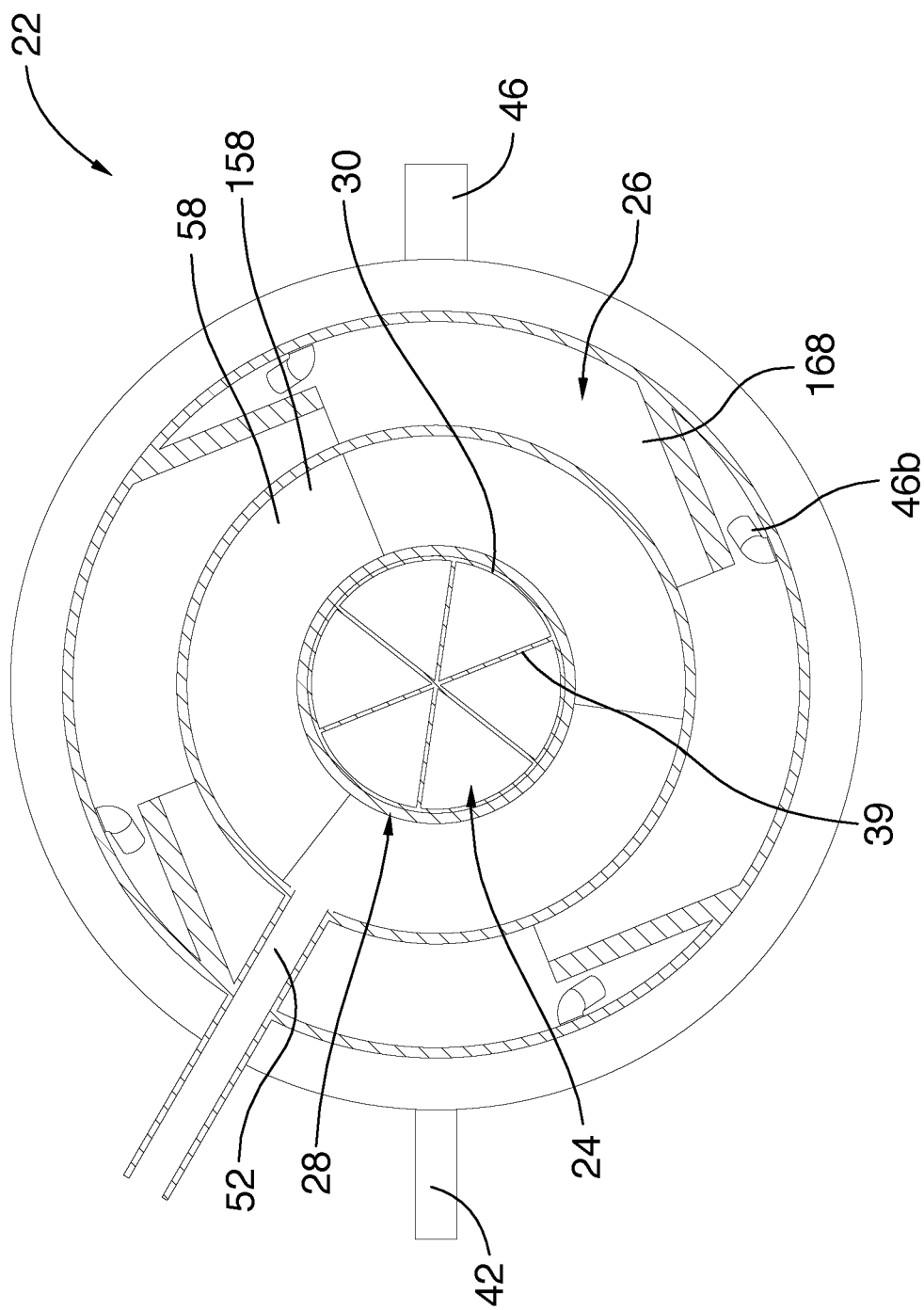
FIG. 8 is a cross sectional view along the line 8-8 of FIG. 4.
Figure 9:
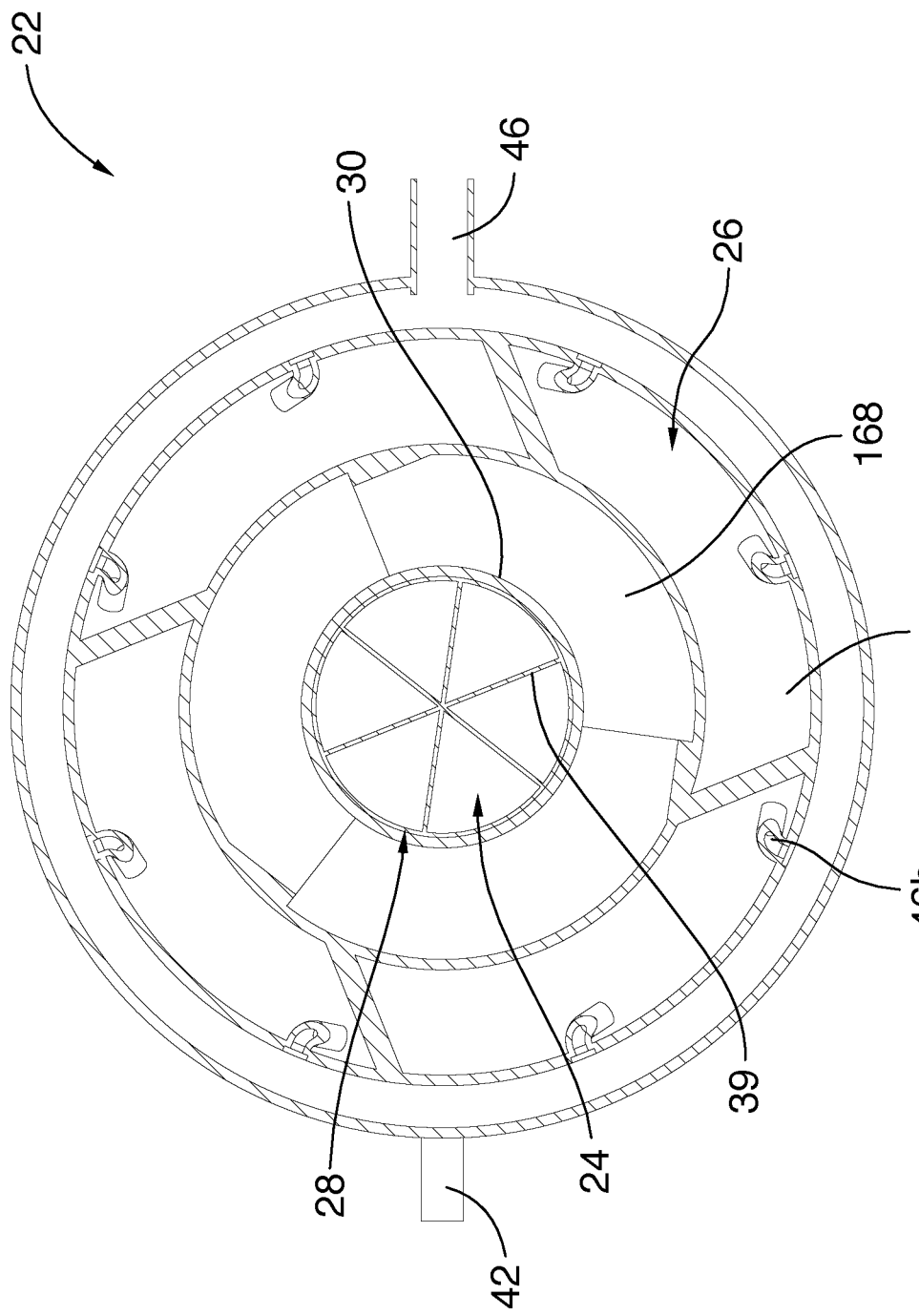
FIG. 9 is a cross sectional view along the line 9-9 of FIG. 4.

With reference to FIG. 4, vacuum furnace 10 can further comprise a heating vessel 58 that is configured to direct heat energy from a hot gas contained therein towards the first section. In one embodiment, heating vessel 58 is a heat recuperation chamber 158 which thermally operates between the first section 24 and the second section 26, wherein, the first and second sections 24, 26 are concentrically arranged in respect to each other in a co-coaxial arrangement. The heat recuperation chamber 158 comprises a hollow body 160 having a receiving end 162 configured to receive one or more gaseous byproducts 54 produced when gaseous $SiO_2$ 16 is reduced into the Si 18 product in the second section 26 and a discharge end 164, opposite the receiving end, for discharging gaseous byproducts 54 away from the vacuum furnace 110 via the one or more second vacuum outlets 52 by a vacuum source (not shown). In some embodiments, the heat recuperation chamber 158 can have a flow area which is the same or substantially the same as the flow area of the second section 26. It is recognized that such a configuration may minimize the velocity changes of the flow and avoid back-pressure in the vacuum furnace 10.

The heat recuperation chamber 158 is configured so as be able to conduct heat 59 from the hot gases contained therein into the first section 24. Under an applied vacuum, hot gases produced in reduction reactions (including reaction various byproducts 54 and/or any unreacted gases) in the second section 26 can be drawn into the body 160 of the heat recuperation chamber 158 and heat 59 from produced gases can be directed towards and be used to provide heat to the first section 24 where the evaporation steps are taking place.

The provision of the heat recuperation chamber 158 advantageously decreases the energy (e.g. electrical energy) requirements in the evaporation process which cause the silica-containing material 12 to evaporate the liquid $SiO_2$ 14 into gaseous $SiO_2$ 16. Additionally, the provision of the heat recuperation chamber 158 also allows the operator to monitor and adjust the process temperatures and pressures as desired to increase the rate and efficiency of method.

In an example embodiment, the second section 26 and/or the heat recuperation chamber 158 can include one or more vanes 168. Vanes 168 are configured to form a substantially helical path for the movement of gases contained therein and thereby adjust (slow) the transit time of the gases moving therethrough. In some example embodiments this allows for a sufficient amount of time for the reactants to undergo the reduction reactions and to minimize or avoid a loss of the Si 18 product with the flow. In some embodiments, vanes 168 extend the residency time in order to reduce the gaseous $SiO_2$ into liquid silicon. In some embodiments, the ratio of the vapor flow area of the second section 26 to the vapor flow area of the first section 24 is about 70:1. In some example embodiments, the vanes 168 are positioned and shaped to promote and induce a circumferential flow of the gases in the second section 26 and/or the heat recuperation chamber 158 so as to inertially separate the heavier particles of produced liquid silicon 18 product so that this silicon 18 can condense and/or coalesce on and then flow down the walls of the second section 26 and/or the heat recuperation chamber 158 and towards the reservoir at the bottom of the second section, where it is later drained from the Si product taps 42. In some example embodiments, the vanes 168 increase thermal coupling between the second section 26 and/or the heat recuperation chamber 158 with the first section 24.

Figure 10:
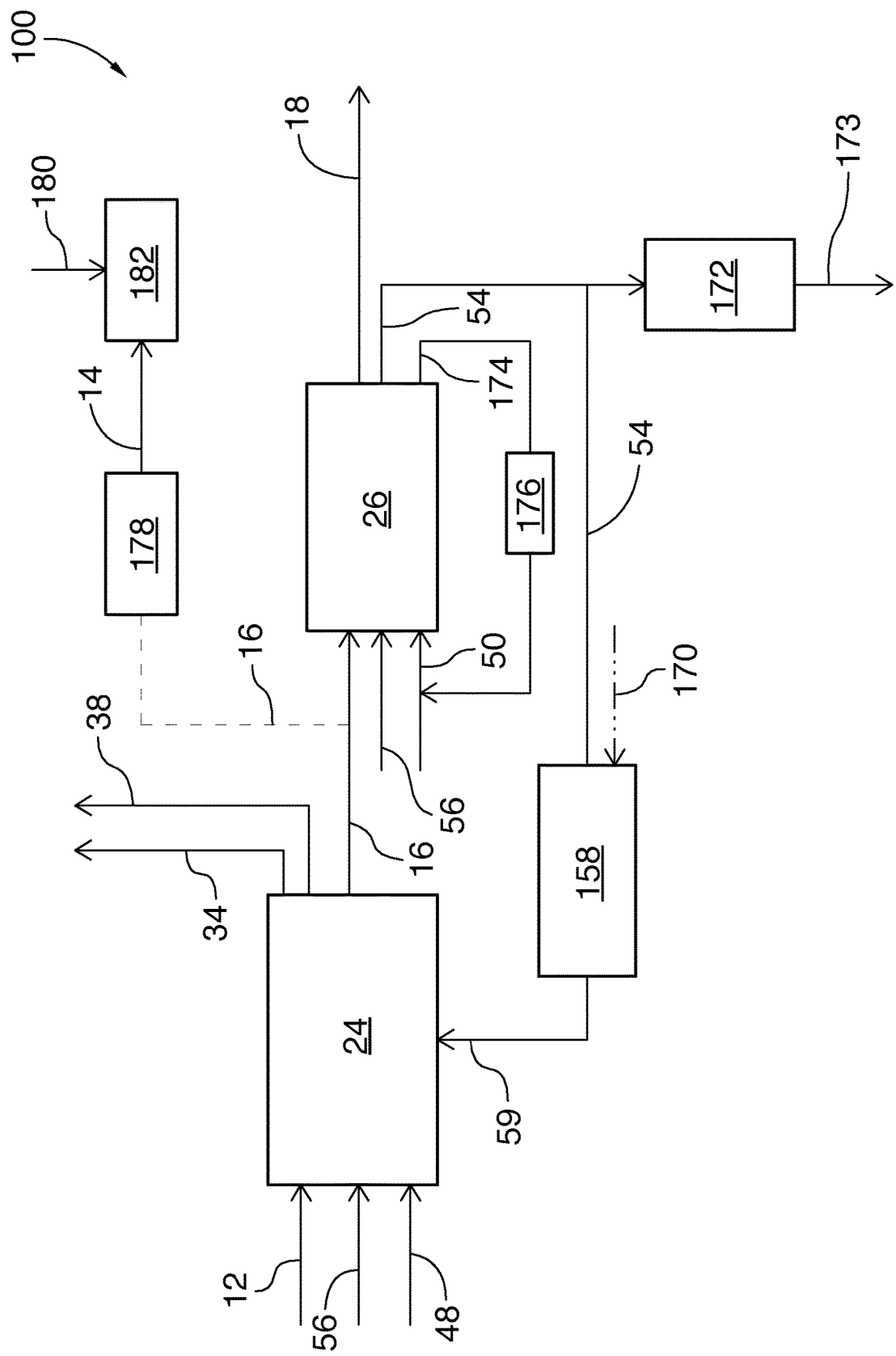
FIG. 10 is a process flow diagram for a method for producing silicon from a silica-containing material according to an example embodiment.
Figure 11:
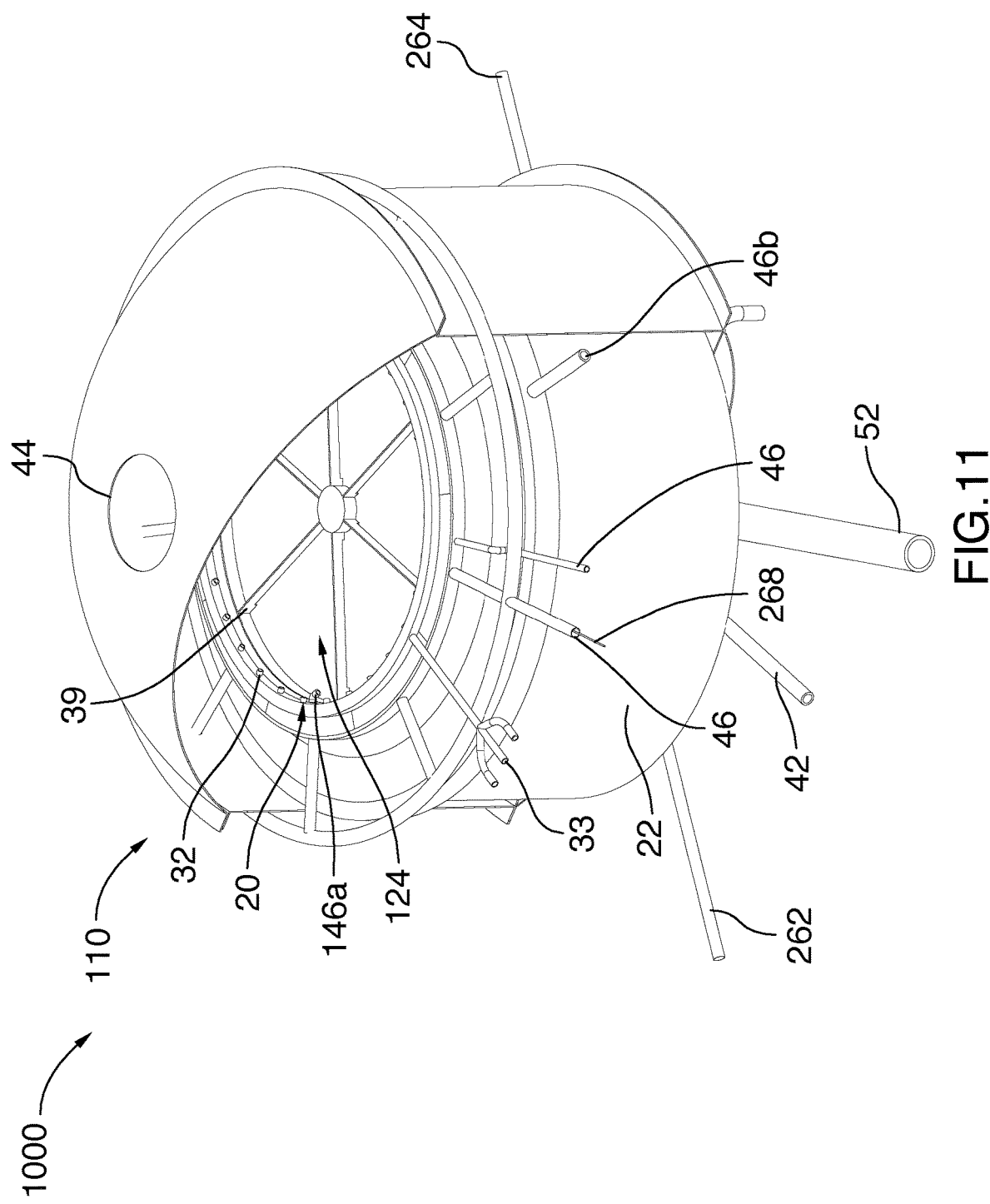
FIG. 11 is a perspective view of system, including a vacuum furnace with a portion of the sidewall and top wall removed exposing a reaction vessel, according to another example embodiment.
Figure 12:
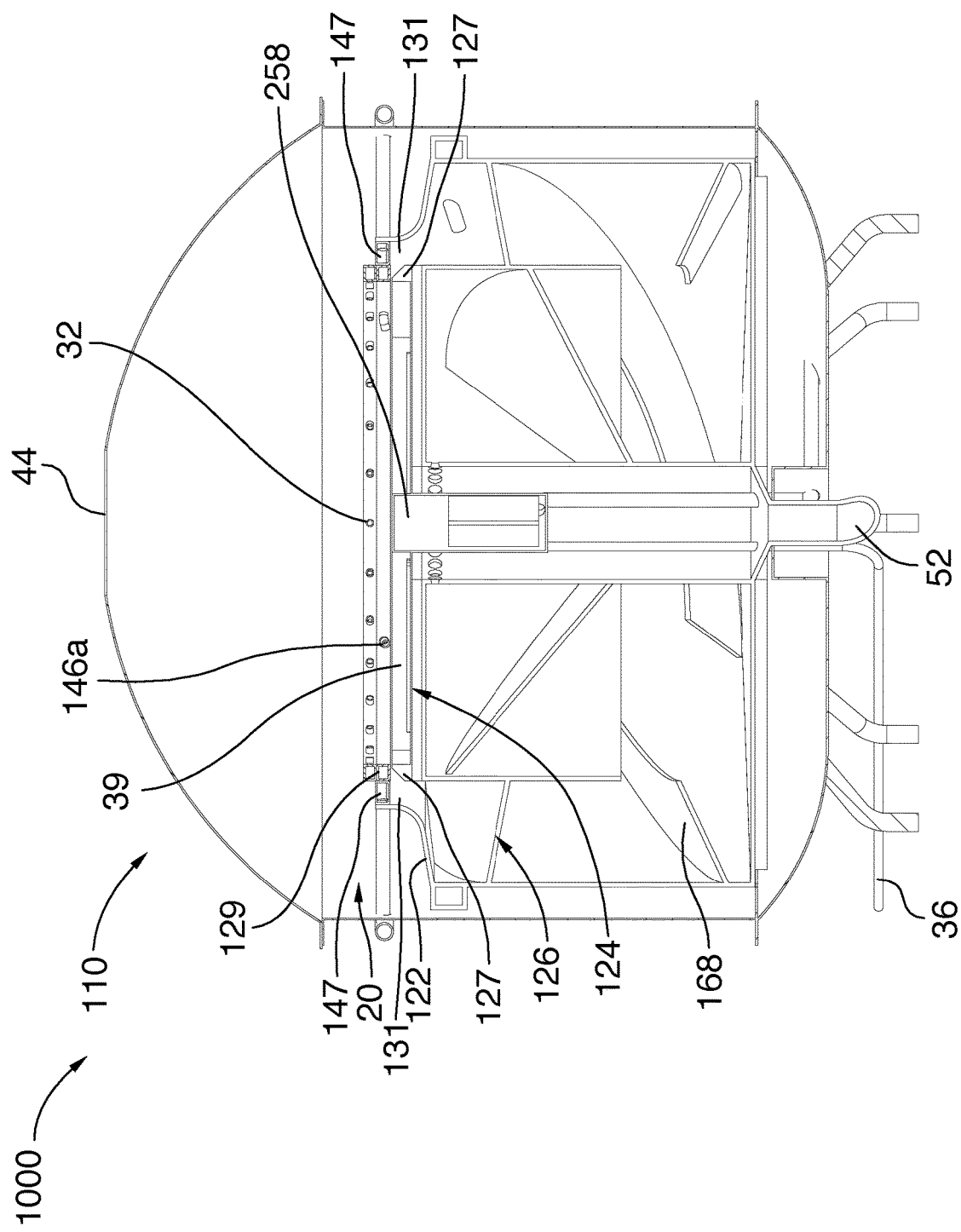
FIG. 12 is a side elevation top view of the vacuum furnace of FIG. 11.
Figure 13:
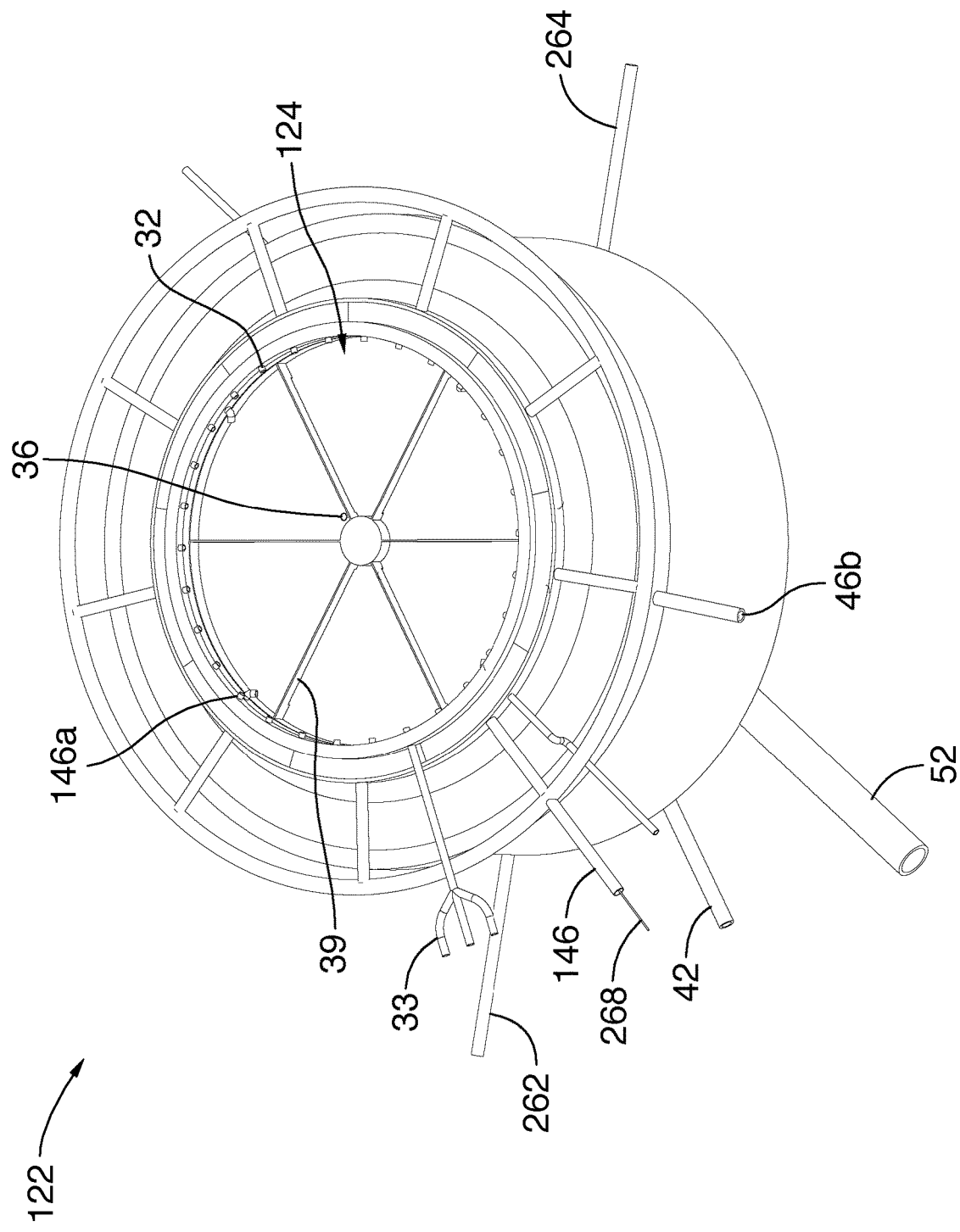
FIG. 13 is a perspective view of the vacuum furnace of FIG. 11.
Figure 14:
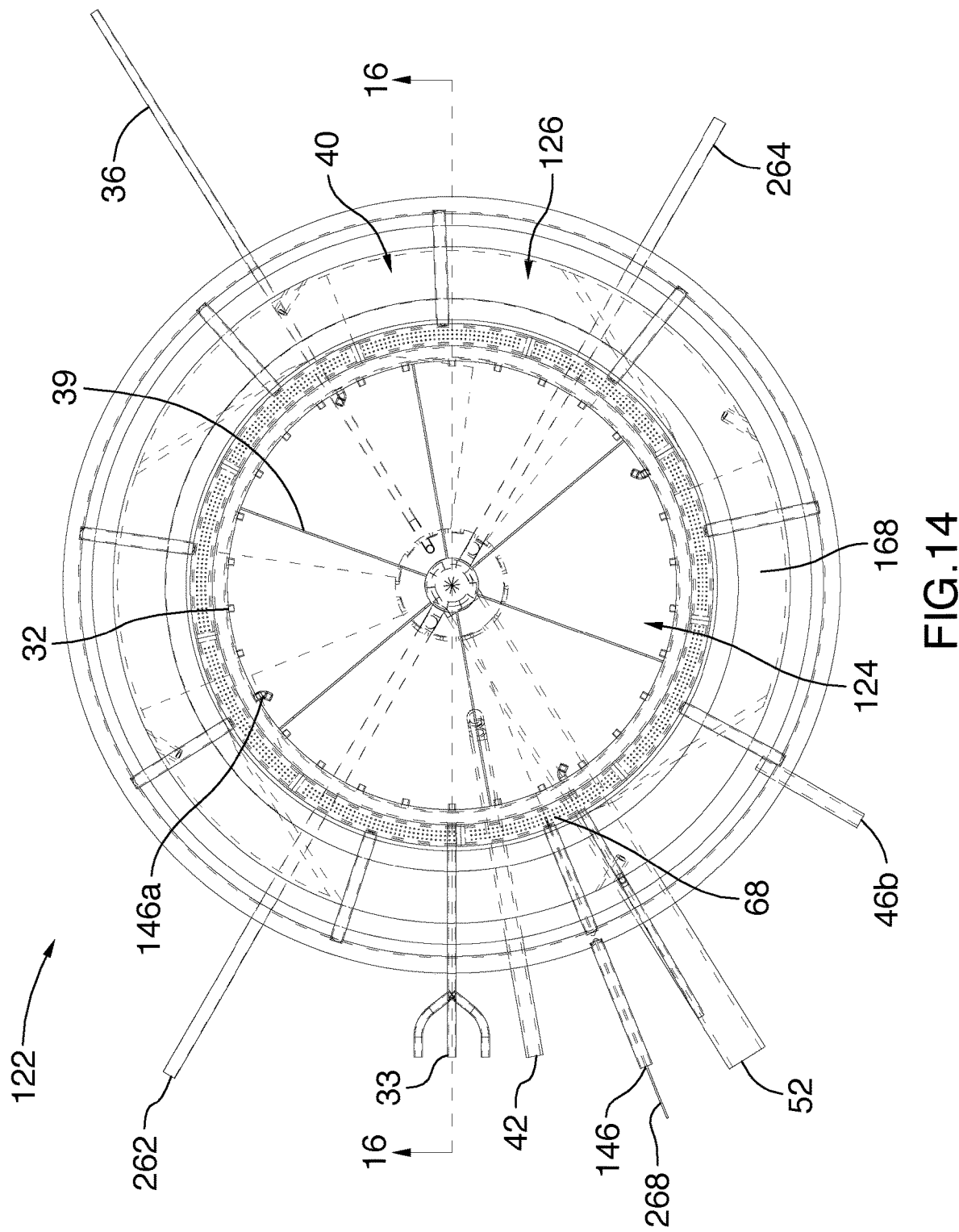
FIG. 14 is a top view of the reaction vessel of FIG. 13.
Figure 15:
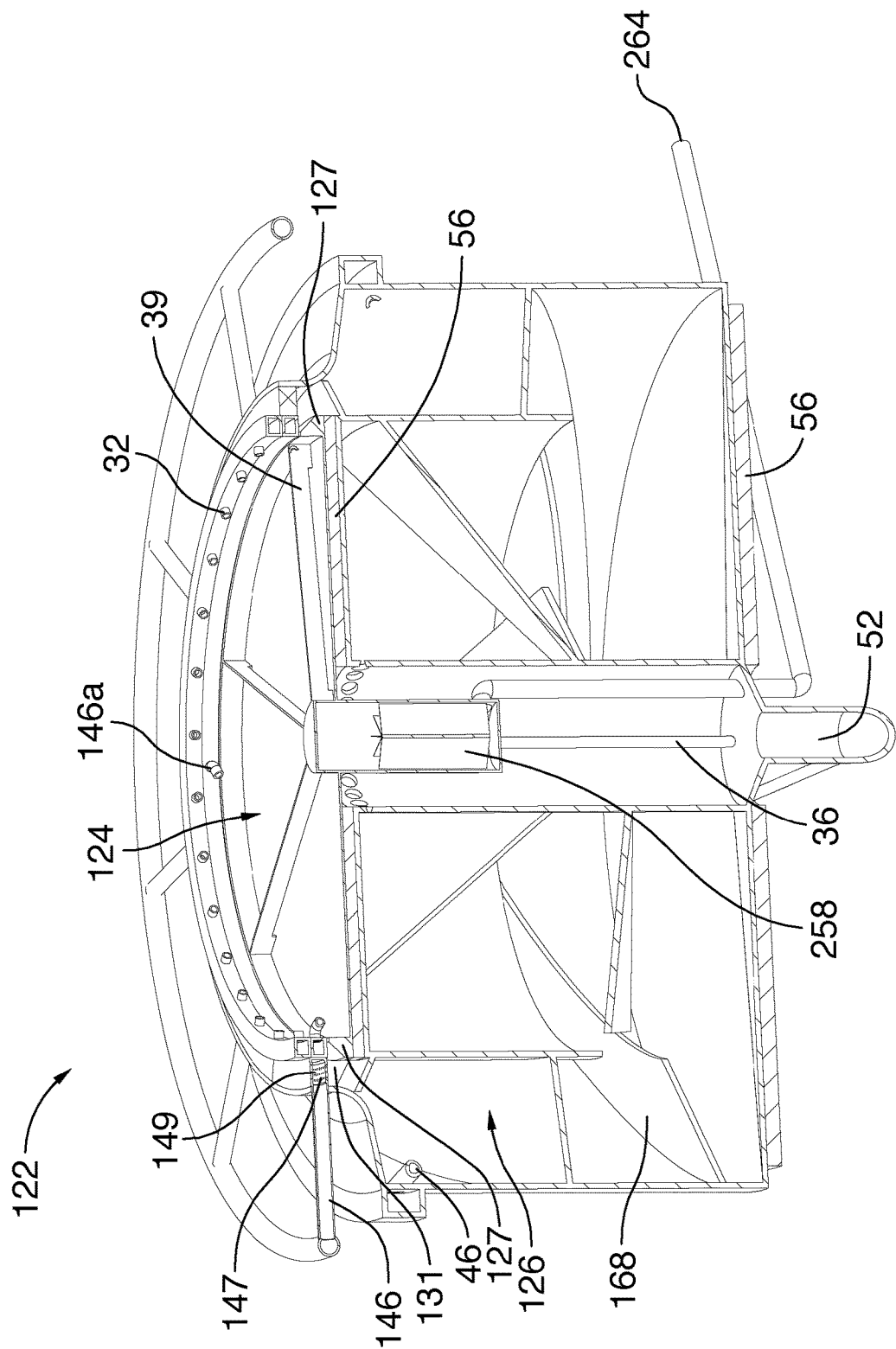
FIG. 15 is a perspective of the reaction vessel of FIG. 14.
Figure 16:
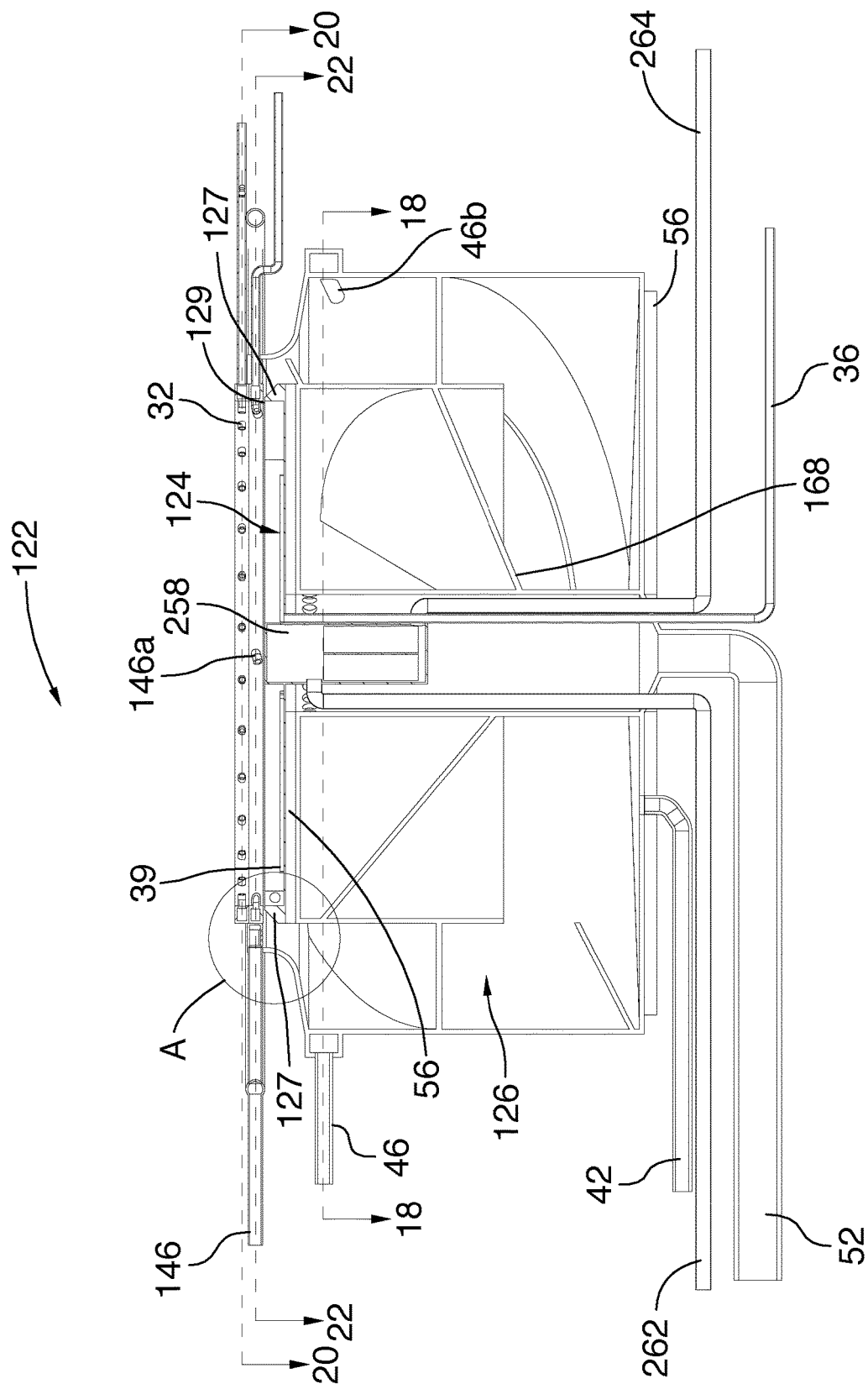
FIG. 16 is a cross sectional view along the line 16-16 of FIG. 14.

With reference to FIG. 10, process 100 generally outlines a method for producing Si 18 from silica-containing material 12 using the system 11, according to one embodiment. The elements in FIG. 10 can represent system components to perform the process 100 or materials of the process 100. Broadly, silica-containing material 12 comprising quartz or silica ($SiO_2$ or silicon dioxide) is the feedstock for the process 100. The silica-containing material 12 and inert gas 48 are fed into the first section 24. In other examples, the entire chamber 20 of vacuum furnace 10 is fed. The quartz or silica, in the presence of the inert gas 48, is then non-reactively heated in the first section 24 at standard pressure or greater than standard pressure. At this step, the heating is non-reactive because the heating of the silica-containing material 12 is performed in the absence of reducing agents and therefore, no reduction reaction takes place at this time. In an embodiment, the first section 24 (and/or the entire chamber 20) may also be flushed and flooded with the inert gas 48 to remove any air and humidity before the introduction of the silica-containing material 12. In another embodiment, the first section 24 (and/or the entire chamber 20) can also be subjected to vacuum to remove any humidity or undesirable gases before the introduction of the silica-containing material 12.

The silica-containing material 12 that includes solid $SiO_2$ is heated in the first section 24 using one or more heat sources 56 to a temperature which is sufficient to heat the $SiO_2$-containing material 12 that includes solid $SiO_2$ and convert the solid $SiO_2$ contained therein into liquid $SiO_2$ 14 (or to maintain $SiO_2$ in the liquid form if already in liquid form) at standard pressure or higher. In some example embodiments, the first temperature is above the melting point (the melting point of $SiO_2$ is about 1983 K (1710 C)) but below the boiling point (the boiling point of $SiO_2$ at standard pressure is about 2500 K (2227 C)) of $SiO_2$ at atmospheric pressure or higher. In some embodiments, the first temperature is about 2100K (~1827 C), for example. The first temperature in the first section 24 may depend on the chosen operating pressures used in the conversion of the liquid $SiO_2$ 14 into gaseous $SiO_2$ 16 in the second section 26. For instance, if a relatively high operating pressure (e.g. 3500 Pa to 4000 Pa) is used to convert the liquid $SiO_2$ 14 into gaseous $SiO_2$ 16, then a relatively higher first temperature in the first section 24 (e.g. 2100 K) would be used. A relatively high operating pressure may be expected to increase the rate of silicon production because this will allow for an increased density of the gases (e.g. gaseous $SiO_2$ 16 and one or more process gases 50, e.g. $H_2$) that participate in the reduction reaction in the second section 26. This will also reduce the velocities of the one or more process gases 50 (e.g. $H_2$) through the reaction vessel 22 at a given molar rate.

Once the first temperature has been attained, the $SiO_2$ is in a completely liquid state, and the pressure inside the vacuum furnace 10 is reduced gradually, via the first section vacuum outlet 32, for example, to a subatmospheric pressure sufficient to convert the liquid $SiO_2$ 14 into gaseous $SiO_2$ 16. A relatively higher operating pressure in the range of about 3500 Pa to about 4000 Pa can be used to achieve a higher production rate. This is because the density of the process gas (e.g. $H_2$) increases as the pressure increases, which allows more gaseous $SiO_2$ 16 to be generated and then processed (reduced) in a given time period by also increasing the heat input to section one 24. In some example embodiments, the subatmospheric pressure is on or about 3500 Pa (the boiling point of $SiO_2$ at about 3500 Pa is about 2100 K).

In an example embodiment, during the heating of the silica-containing material 12 and/or gradual and controlled reduction of the pressure to the subatmospheric pressure sufficient to convert the liquid $SiO_2$ 14 into gaseous $SiO_2$ 16, there may be an evaporation of one or more contaminants 34 in the silica-containing material 12 before the $SiO_2$ becomes vaporized due to one or more interim subatmospheric pressures. Such contaminants 34 will have vapor pressures above (or well above) the vapor pressure of $SiO_2$ at the first temperature (e.g. 2100 K). Accordingly, these contaminants 34 which will be evaporated from the silica-containing material 12 can then be removed via the first section vacuum outlet 32 by the vacuum source (not shown here).

Example gaseous contaminants 34 which have now been vaporized and removed via the first section vacuum outlet 32 at this step can include phosphorous (P), zinc (Zn), sodium (Na), calcium (Ca), antimony (Sb), lead (Pb), indium (In), manganese (Mg), or gallium (Ga), or combinations thereof. It will be appreciated that as the pressure is gradually reduced, different gaseous contaminants 34 will begin to evaporate at different times before the $SiO_2$ begins to evaporate. For example, P, Zn, Na and Mg are expected to be some of the first elements to evaporate since their vapor pressure is above standard pressure at the first temperature (e.g. 2100 K). As the pressure is reduced further to just below standard pressure, other contaminants such as Ca, Sb, Bi and Pb will begin to evaporate.

In some embodiments, a specific pressure is held for a period of time, or two or more different pressures may be cycled back-and-forth, if the off gassing components 34 are to be segregated for different treatment after being extracted. The cycling of pressures may be done over a range equivalent to the hydrostatic pressure between the surface and the deepest point in the melt and in doing so, the evaporation of gaseous contaminants 34 may be enhanced.

Once the higher vapor pressure gaseous contaminants 34 have been evaporated, the pressure of the vacuum furnace 10 can be further reduced by vacuum to on or about e.g. 3500 Pa at which time the first section vacuum outlet 32 leading into the first section 24 can be closed and one or more other vacuum outlets (e.g. second vacuum outlets 52) can be opened. According to one embodiment, closure of the first section vacuum outlet 32 and opening of the second vacuum outlets 52 is approximately below the vapor pressure of Ga and approximately above the vapor pressure of Al, to prevent incorporating these contaminants in the silicon 18 product or contaminating the reduction section (i.e. the second section 26) of the reaction vessel 22. The timing of the closure of the first section vacuum outlet 32 and opening of the second vacuum outlets 52 can be controlled by one or more control systems (not shown). The control system can include one or more controllers (hardware, software, or a combination of hardware and software). The control system can include one or more processors, and memory for storing instructions executable by the one or more processors. The control system can be configured to detect the flow rate of specific gases from the first section vacuum outlet 32 and, when this specific gas is detected, the control system will close the first section vacuum outlet 32, open gas inlets 46 to introduce process gas 50 in the second section, and/or open the second vacuum outlets 52 to begin expelling byproducts 54. In some embodiments, the specific gases may be $O_2$, SiO or $SiO_2$ which the presence of would be indicative that $SiO_2$ is undergoing evaporation when the process gas 50 is $H_2$.

At this point, the liquid $SiO_2$ 14 will begin to boil and the gaseous $SiO_2$ 16, which is now free (or substantially free) of those contaminants 34 which have been evaporated, will fill the first section 24. And because the first and the second sections 24, 26 are in fluid connection/communication, the gaseous $SiO_2$ 16 will begin to flow out the exhaust port 30 and into the second section 26 as a very pure gaseous $SiO_2$ 16.

Once the gaseous $SiO_2$ 16 is flowing into the second section 26, a variety of reactions may be undertaken to reduce the gaseous $SiO_2$ to liquid silicon and gas or vapor byproduct, wherein the gas or vapor byproduct 54 can be removed from the vacuum furnace 10 via the second chamber outlet 52 operably connected to a vacuum source (not shown).

In the second section 26, process gas or plasma 50 can be introduced at a controlled flow rate into second section 26 to react with the gaseous $SiO_2$ 16 which has been vented through the exhaust port 30 and is spilling over and flowing down into the second section 26. The reaction of the gaseous $SiO_2$ 16 and the process gas 50 in the second section 26 will be explained in detail below.

According to an embodiment, the method for producing silicon 18 from a silicon dioxide ($SiO_2$)-containing material 12 that includes solid $SiO_2$ comprises: heating the $SiO_2$-containing material 12 that includes the solid $SiO_2$ to a $SiO_2$-containing material that includes liquid $SiO_2$, at a sufficient temperature to convert the solid $SiO_2$ into the liquid $SiO_2$ 14; converting, in the first section 24, the liquid $SiO_2$ 14 into gaseous $SiO_2$ 16 that flows to the second section 26 by reducing the pressure of the vacuum furnace 10 and consequently in the first section 24 of the reaction vessel 22 to a subatmospheric pressure; and reducing, in the second section 26, the gaseous $SiO_2$ 16 into liquid silicon 18.

According to an embodiment, the reducing of the pressure of the vacuum furnace 10 and in the first section 24 to the subatmospheric pressure is performed over a continuous range of one or more interim pressures sufficient to evaporate one or more contaminants from the $SiO_2$-containing material that contains the liquid $SiO_2$ to one or more gaseous contaminants 34 removing, by vacuum, the one or more gaseous contaminants 34 evaporated from the $SiO_2$-containing material 12 that contains the liquid $SiO_2$ 14 due to the one or more interim pressures, prior to the pressure reaching the subatmospheric pressure that converts the liquid $SiO_2$ 14 into the gaseous $SiO_2$ 16.

Accordingly, the system 11 is for producing silicon 18 from a silicon dioxide ($SiO_2$)-containing material 12 that includes solid $SiO_2$. The system 11 comprises: heat source 56 for heating the $SiO_2$-containing material 12 that includes solid $SiO_2$ to a $SiO_2$-containing material that includes liquid $SiO_2$, at a sufficient temperature to convert the solid $SiO_2$ into the liquid $SiO_2$ 14; reaction vessel 22 comprising first section 24 and a second section 26 in fluid communication with said first section 24, said first section 24 for containing the $SiO_2$-containing material 12 that includes liquid $SiO_2$; a vacuum source for reducing the pressure in the vacuum furnace 10 and the first section 24 to a subatmospheric pressure for converting, in the first section 24, the liquid $SiO_2$ 14 into gaseous $SiO_2$ 16 that flows to the second section 26; wherein the second section 26 is for reducing of the gaseous $SiO_2$ 16 into liquid silicon 18 in the second section 26.

According to an embodiment, the system 11 further comprises at least one gas inlet 46 to facilitate the reducing of the gaseous $SiO_2$ 16 into the liquid silicon 18 in the second section 26 by introducing process gas 50.

In some example embodiments, the process gas or plasma 50 may be $H_2$ gas. $H_2$ gas will mix and react with the gaseous $SiO_2$ 16 according to the following reduction reaction: $SiO_2 g + 2H_2 g \rightarrow Si + 2H_2O g$. As a result, the gaseous $SiO_2$ 16 will precipitate and/or coalesce into liquid silicon 18 and will fall down and be collected in the second section 26. The evolution of hot $H_2O$ vapor byproduct 54, will be removed from the vacuum furnace 10 via the second vacuum outlet 52 operably connected to a vacuum source (not shown). In some embodiments, $H_2$ gas can be initially mixed with inert gas 48 (such as argon) and gradually the ratio of $H_2$ to inert gas 48 is increased until only process gas 50 is used. In some example embodiments, the amount of $H_2$ can be about 7 times or greater than stoichiometric ratio in order to prevent the reaction temperature peak from approaching the vapor temperature of the Si 18 product. The $H_2$ which is not used up in the reaction (approximately 88 to 93%, or preferably 85% to 86%) can be separated from the $H_2O$ gas for re-use by an external system (not shown).

In other embodiments, the process gas or plasma 50 may be CO (carbon monoxide) gas and can also in a higher than stoichiometric ratio. CO gas will mix and react with the gaseous $SiO_2$ 16 according to the following reduction reaction: $SiO_2 g + 2CO g \rightarrow Si + 2CO_2 g$. Similarly, the gaseous $SiO_2$ will precipitate into liquid silicon 18 and will fall down and be collected in the second section 26 and the resulting in carbon dioxide gas byproduct 54 can be removed from the vacuum furnace 10 via the vacuum chamber outlet 52 operably connected to a vacuum source (not shown). In some example embodiments, the amount of CO can be about 7 times or greater than stoichiometric ratio. The excess CO gas not converted during the reaction can be separated from the $CO_2$ gas for use by a separate system (not shown).

Other process (reactive) gas or plasma 50 can also be used to reduce gaseous $SiO_2$ 16 to liquid Si 18. Furthermore, the reduction reactions can also be facilitated with additional activation energy in the form of an arc, plasma injection, microwaves or UV radiation. Moreover, the rate of the reduction reactions can be increased by the use of various known catalysts.

Meanwhile, the pressure is maintained in the vacuum furnace 10 at about subatmospheric pressure (e.g. around 3500 Pa) so that the vaporization point of $SiO_2$ is kept at around the first temperature (e.g. 2100 K) (where the boiling point of $SiO_2$ at about 3500 Pa is about 2100 K). The vacuum outflow in the vacuum furnace 10 can be adjusted in order to compensate for the introduction of the process gas or plasma 50 and the resulting $H_2O$ vapor or other gas byproducts 54. For example, in a situation where there is an unintended increase in the evaporation rate (due to too much heat input for example), the increased evaporation rate can be quickly reduced by increasing the control point pressure. This can be done very rapidly by a controlled injecting of inert gas 48 (e.g. Ar) into the first section 24 and/or second section 26 which would cause a rapid pressure increase. The result is a termination of the reaction, since the $SiO_2$ will stop evaporating as the pressure rises above its vapor point. In another embodiment, slow adjustment in pressure would be used to control the evaporation rate in relation to process gas 50 (e.g. $H_2$) flow and power input to the heat source 56, or other adjustments when the heat recuperation chamber 158 is used to provide heat to the vaporization process taking place in the first section 24.

At the end of the process, the resultant high purity liquid silicon 18 product which has collected at the bottom of the reaction section 26 can be tapped or vacuum drained via the product tap 42.

According to an embodiment, the second section 26 can be held at a different temperature than the first section 24 using one or more heat sources 56. In this embodiment, the temperature in the second section 26 can be a temperature sufficient to evaporate various undesirable impurities that may have been collected along with the liquid silicon 18 product in the second section 26. In one embodiment, the temperature in the second section 26 is higher (i.e. above 2100K) than the temperature in the first section 24. For example, under these conditions, any un-reacted gaseous $SiO_2$ 16 that may have happened to condense as liquid $SiO_2$ 14 into the second section 26 before being reduced to liquid silicon 18, will be caused to re-evaporate and allow for another opportunity to undergo a reduction reaction with the process gas or plasma 50. This is possible because the vapor temperature of liquid silicon 18 at the process pressure is over 2800 K, and therefore, there is no potential loss of silicon 18 due to evaporation in this process.

Similarly, other undesirable impurities may include SiO which can be evaporated by adjusting the temperature in the second section 26 to a temperature sufficient to evaporate SiO. Any evaporated SiO can then react with the process gas 50 or be removed by vacuum leaving a more pure liquid silicon 18 product in the second section 26.

According to an embodiment, additional advantages attained by using the system 11 and method 100 disclosed herein can be achieved depending on the nature of the process gas or plasma 50 used and the respective gas byproduct 54 produced.

For example, a reduction of overall energy requirement of the system 11 and method 100 and a reduction of environmental impact may be achieved when $H_2$ is used as the process gas 50, according to an embodiment. In this embodiment, the reaction of $SiO_2g + 2H_2g$ will produce $Si + 2H_2Og$. The resultant byproduct of $H_2O$ gas will be at a high temperature. Under an applied vacuum via the second vacuum outlet 52, gases (including reaction byproducts such as hot $H_2O$ vapor 54 or unreacted gases including $H_2$ or $SiO_2$ related vapor) in the second section 26 can be drawn into the heat recuperation chamber 158 and heat 59 from hot $H_2O$ vapor 54 produced in the reduction reaction can be used to heat the first section 24 and decrease the energy (e.g. electrical energy) requirements in the supply of heat required to evaporate the liquid $SiO_2$ 14 into gaseous $SiO_2$ 16 in the first section 24. The temperature of the hot $H_2O$ vapor 54 may be expected to be over 1600 degrees C., and in some embodiments, over 2200 degrees C.

In additional embodiments, the system 11 can include a plurality of vacuum furnaces 10 whereby heat 59 produced by aforementioned reduction reactions in one vacuum furnace 10 could be used to heat one of more of the other vacuum furnaces 10. In one embodiment comprising three vacuum furnaces 10, the vacuum furnaces 10 are operated in a staggered cyclical arrangement such that the produced heat 59 from a first vacuum furnace 10 contributes to the heating steps in a second vacuum furnace 10 in sequence and the produced heat 59 from the second vacuum furnace 10 contributes to the to the heating steps in a third vacuum furnace 10.

Additionally, $H_2$ can be directed into the heat recuperation chamber 158 and burned in the presence of oxygen or air 170. The heat 59 formed as a result, can also be used to heat the first section 24 and decrease the energy (e.g. electrical energy) requirements in the initial non-reactive heating step taking place in the first section 24.

Alternatively, as another way of reducing overall energy consumption (e.g. electrical energy consumption) according to an example embodiment, the system 11 can be provided with one or more external heat exchangers (not shown) which can use the energy stored in the produced hot $H_2O$ vapor to heat the silica-containing material 12 in the first section 24 during in the initial heating step performed in the same vacuum furnace 10 or performed another different/separate vacuum furnace 10.

Additionally or alternatively, as a way of reducing the environmental impact, the hot $H_2O$ vapor 54 can then be cooled into liquid $H_2O$ and/or filtered to remove any particulates in a processing module 172 before exhausting the $H_2O$ 173 into the environment or using it in an electrolyzer or other carbon free process to produce hydrogen gas for use in the reaction process, in contrast to current carbo-thermic methods which result in the production of $CO_2$ and $CO$ greenhouse gases.

Additional advantages may be attained when $H_2$ is used as the process gas 50. For example, the produced hot $H_2O$ vapor 54 can be used in other processes. For instance, the heat from the hot $H_2O$ vapor can be used in a steam-methane reforming process to produce hydrogen from natural gas ($CH_4$). It may be especially beneficial that reforming processes used for the production of hydrogen from natural gas may be carried out without needing additional heating input. In an embodiment, the produced $H_2O$ vapor exhaust temperature according to the system 11 and method 100 is expected to be greater than about 1800 to about 2200 degrees C., and preferably about 1800 degrees C., which is substantially greater than the 1000 degree C. of $H_2O$ vapor required in steam-methane reforming processes. Electrolytic production of hydrogen for use in the reduction process would simply use electrical power and distilled water, which can be provided by cooling the $H_2O$ product from the reactor. In one embodiment hydrogen gas for the reducing reaction can be provided by employing the Kvearner process or some similar Plasma Pyrolysis of natural gas (methane or $CH_4$) process in a separate system which produces hydrogen and captured carbon black, which is a useful product of value that can be used by other industries, while capturing the carbon which maintains the present process of silicon production as a green process.

Many contaminants in the original feedstock never reach their vapor point during the initial heating step and as such remain un-evaporated contaminants 38 in the first section 24. These un-evaporated contaminants 38 include but are not limited to, aluminum (Al), tin (Sn), copper (Cu), iron (Fe), titanium (Ti), Boron (B). In some embodiments, the remaining un-evaporated contaminants 38 can be flushed out of first section 24 with some of the remaining contaminated liquid $SiO_2$ 14 prior to re-charging of the first section 24 with a fresh charge of silica-containing material 12 for the next batch run.

In the conventional processes, numerous contaminants including the list of un-evaporated contaminants 38 and many of the evaporated contaminants 34 (which are now removed according to the system 11 and method 100 of example embodiments) would normally be mixed in with the liquid silicon, while the reduction reaction of $SiO_2$ to Si is taking place. All these remaining contaminants would have to be removed from the Si perhaps in separate processes before the Si can be used in applications such as solar panel applications.

According to another embodiment, with reference to FIG. 10, any unreacted gases 174 that are removed by vacuum by the second vacuum outlets 52 may be further processed in a separator module 176 to separate out those gases which can be recycled back into the system 11. For example, in the case where $H_2$ is used as the process gas 50, it may be that the amount of $H_2$ that would be needed is far in excess of the stoichiometric requirements for ensuring a complete reaction while limiting the peak temperature of the reaction and in as little time as possible. Therefore, any unreacted and unused $H_2$ that may be part of the $H_2O$ vapor and vented, can be collected and further processed to separate out the $H_2$ which can then be re-injected into the system 11 and the second section 26 as process gas 50, or routed to other similar reactors 10 or cooled and stored for later use.

According to another embodiment, with reference to FIG. 10, the gaseous $SiO_2$ 16 produced in the first section 24 may be directed into one or more cooling modules 178 which may be external to the vacuum furnace 10, for example, so that the gaseous $SiO_2$ 16 may be condensed back into liquid $SiO_2$ 14 for use in a conventional carbo-thermic reaction wherein the high purity liquid $SiO_2$ 14 in the presence of reducing agent such as carbon 180 is reactively heated in any another known reaction vessel 182 or the gaseous $SiO_2$ 16 may be further cooled in one or more cooling modules 178 which may be external to the vacuum furnace 10, for example, to form solid $SiO_2$ for use in any other process where high purity solid $SiO_2$ may be required.

Figure 27:
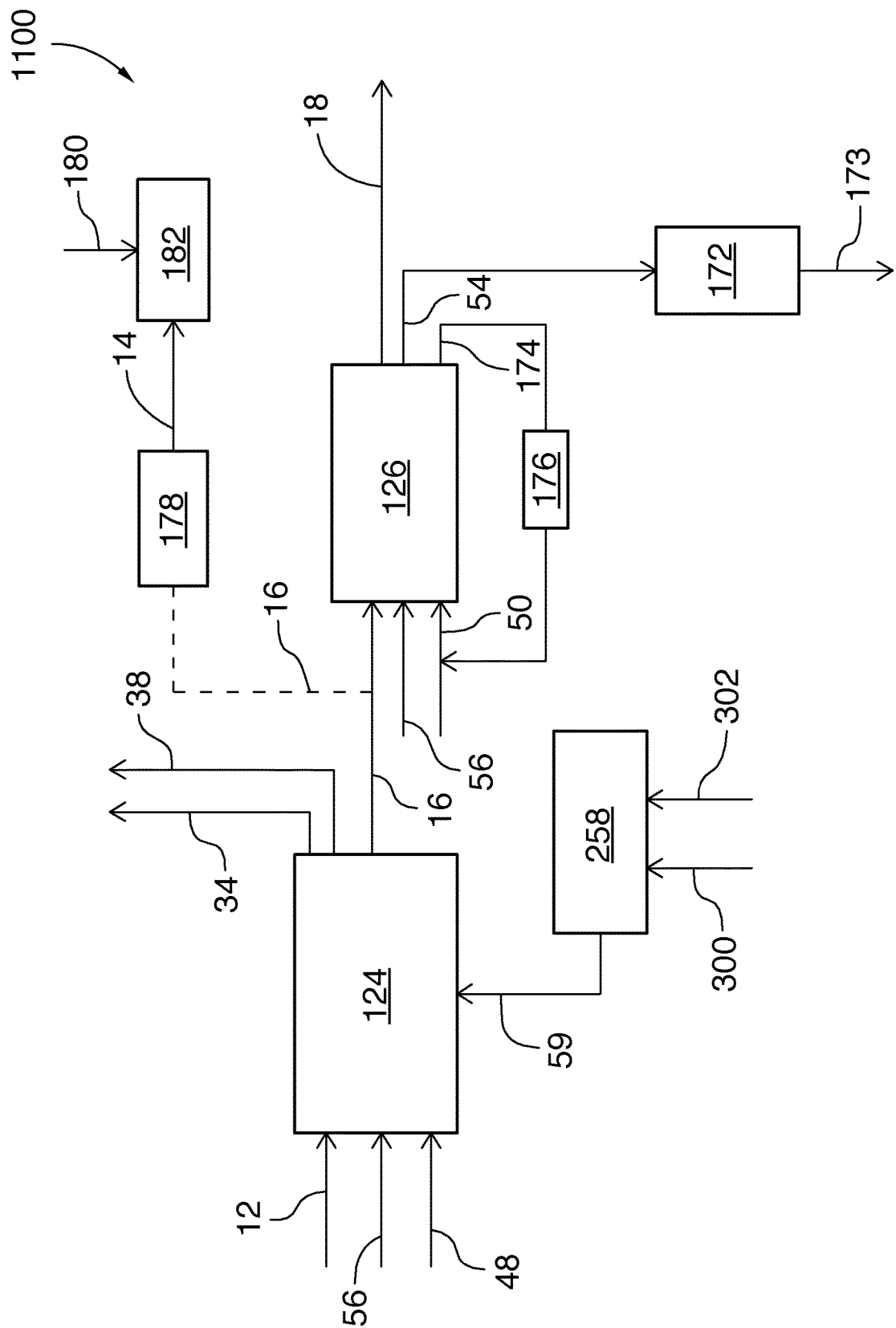
FIG. 27 is a process flow diagram for a method for producing silicon from a silica-containing material according to another example embodiment.

FIGS. 11 to 26 show another embodiment of system 1000 that includes a vacuum furnace 110, the system 1000 for producing silicon from silica-containing material 12. FIG. 27 shows a process 1100 which outlines a method for producing Si 18 from silica-containing material 12 using the system 10000 according to an embodiment. The elements in FIG. 27 can represent system components to perform the process 1100 or materials of the process 1100.

In the embodiment shown in FIGS. 11 to 26, disposed within the chamber 20 is a reaction vessel 122 having a first section 124 and a second section 126. First section 124 has a substantially cylindrical shape with a relatively large ratio of width to height, and as such, the first section 124 is configured to promote evaporation because of its large surface area and relatively shallow depth. In the embodiment shown in FIGS. 11 to 26, the first section 124 is arranged substantially over the second section 126. This is in contrast to the embodiment shown in FIGS. 1 to 9 where first section 24 and the second section 26 are concentrically arranged in respect to each other in a co-coaxial arrangement. First section 124 can include one or more heating blades 39 to promote evaporation.

The second section 126 also has a substantially cylindrical shape, however, the second section 126 is dimensioned to allow for significant expansion of gases therein, as described below. The second section 126 includes one or more gas inlets 46 for introducing various gases into the second section 126. Inlets 46 can be configured to introduce inert gases (e.g. Ar).

One or more vanes 168 are provided to increase the vapor flow area in the second section 126. In some embodiments, the ratio of the vapor flow area of the second section 126 to the vapor flow area of the first section 124 is about 70:1. In one embodiment, the flow path length is increased by forcing a helical pathway, which prevents a direct axial pathway down to where the silicon 18 product collects at the bottom of the second section 126. This increases the time it takes for the gas mixtures to propagate through the reaction section 126, which may result in a more complete reaction process at any given flow rate. The area (as opposed to the volume which is related to path length) determines the flow velocity at any given volumetric flow. The intent of diffusion (increasing the gas path area) is to maintain a constant velocity, by adjusting the area of the flow path to compensate for increased volume resulting from adding gas (i.e. process gas) and increased volume due to temperature rise of the process gas due to the reaction heat release (raising the temperature of the resultant mixture temperature of the cold process gas and hot vapor from the vaporizer). Without being limited to any particular embodiment, maintaining a constant velocity may prevent pressure changes due to the acceleration of the flowing gasses. Acceleration in the gas velocity may be undesirable because it will cause a back pressure on the first section 124 (the force acting over an area required to accelerate the mass of gas becomes a pressure=F/A), which will cause the vaporization rate to change when this pressure gets reflected back to the first section 124. This may result in an oscillation of the process rate, which is not desirable. A similar instability could result if the velocity decelerates causing a pressure decrease The first and second sections 124, 126 are in fluid connection with each other such that when one or more gases are evaporated in the first section 124, the one or more gases can be made to flow into the second section 126, as described below.

With reference to FIGS. 11 to 26, a wall 127 separates the first and second sections 124, 126. Wall 127 has a first section facing side 127a and a second section facing side 127b. At least one channel 129 is formed in the wall 127, the channel 129 or a plurality of channels 129 being dimensioned to allow one or more gases in the first section 124 flow into the second section 126. The one or more channels 129 may have an interior diameter that increases moving from the first section facing side 127a to the second section facing side 127, for reasons discussed in greater detail below.

Proximal to the one or more channels 129 are one or more gas inlets 146 for introducing process gas 50 into the second section 126. As shown, there can be nine gas inlets 146 which are fluid communication with a single gas chamber 147. Gas chamber 147 is arranged substantially above the second section 126, the chamber 147 can be substantially circular (constructed in sections which are individually supplied with gas through individual pipes) and includes an array of holes 149 that are configured to deliver process gas 50 downwards and into the second section 126. Gas inlets 146 are configured to be able to deliver significant amounts of process gas 50 into the second section 126. In some embodiments, the amount of process gas 50 delivered greatly exceeds the stoichiometric value. In an embodiment, the amount of process gas 50 is about 7 times the stoichiometric value. For example, if the process gas 50 is $H_2$, ratio of $H_2$ to $SiO_2$ can be about 14:1.

The temperature of the process gas 50 can be adjusted and/or maintained by an external system (not shown) to suit the particular needs. In one embodiment, the temperature of process gas 50 is significantly lower than the vaporization temperature of the gaseous $SiO_2$ 16 entering the second section 126. While not being limited to any particular embodiment, product yields can be increased as a consequence of the promotion of certain favourable thermodynamic conditions. For example, process gas 50 could be cooled to (or maintained at) temperatures of around 300K, whereby such a temperature would mean a relatively low entropy value and a Gibbs free energy condition that promotes the production of the liquid silicon 18 product. Additionally, the lower peak reaction temperatures will at least minimize, if not avoid, losses of the resultant silicon 18 product due to unintended product vaporization and subsequent removal. In an embodiment where the process gas 50 is a cooled process gas 50, the entire system for delivering process gas 50 can be insulated to keep the temperatures low to promote favourable conditions. For example, the gas inlets 146, gas chamber 147, and all associated piping can be insulated.

The initial mixing and reducing reactions can take place in a mixing region 131 of the second section 126. The mixing region 131 comprises the outside wall of the second section 126, the wall 127, the channel 129, and gas inlet 146 and gas chamber 147. Mixing region 131 is configured to accommodate expansion of the gases when the process gas 50 is initially reacted with gaseous $SiO_2$ 16 flowing through the channel 129 and into the second section 126.

Without being limited to any particular embodiment, if the process gas 50 is set at an initially low temperature relative to the gaseous $SiO_2$ 16, it is expected that there will be expansion of the process gas 50 (and a contraction of the gaseous $SiO_2$ 14) requiring that the mixing region 131 to be dimensioned to accommodate such expansion. The mixing region 131 is configured to avoid back pressurizing of the vaporization section (i.e. the first section 124) which may cause vaporization instability by altering the back pressure on the vaporization section directly affecting vaporization from the liquid $SiO_2$ (since the temperature of the $SiO_2$ defines its vapor pressure, momentary increases in the back pressure will momentarily prevent the vaporization process which may result in oscillatory instability in the vapor flow and process).

According to an embodiment, the one or more channels 129 have an interior diameter which increases in the direction moving towards the second section 126 from the first section 124 such that a vapor flow area for gases proximal the second section 126 is greater than a vapor flow area for gas proximal the first section 124 in order to accommodate expansion of the gases moving from the first section 124 to the second section 124 through the one or more channels 129.

Figure 17:
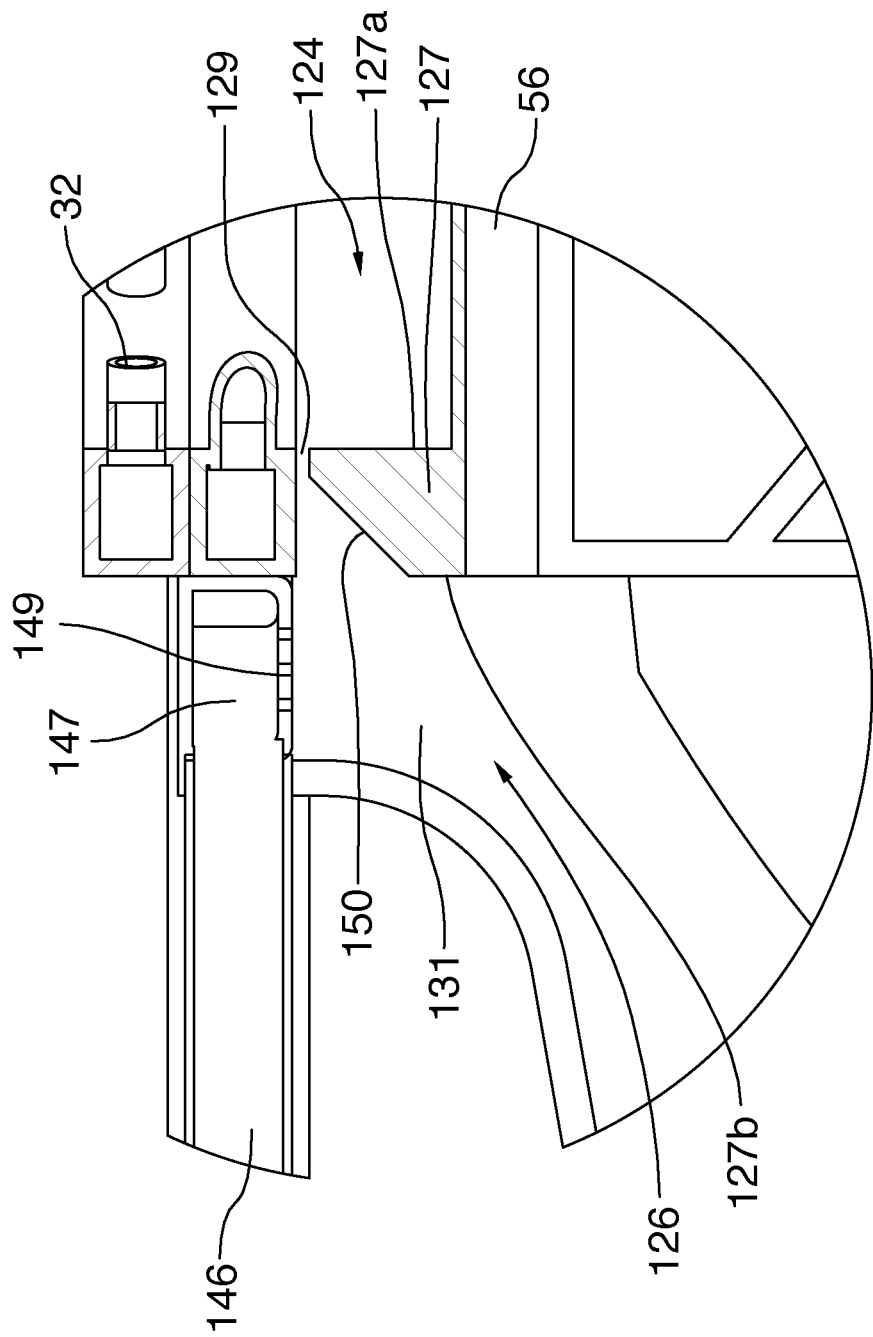
FIG. 17 is an enlarged of detail A of FIG. 16.
Figure 18:
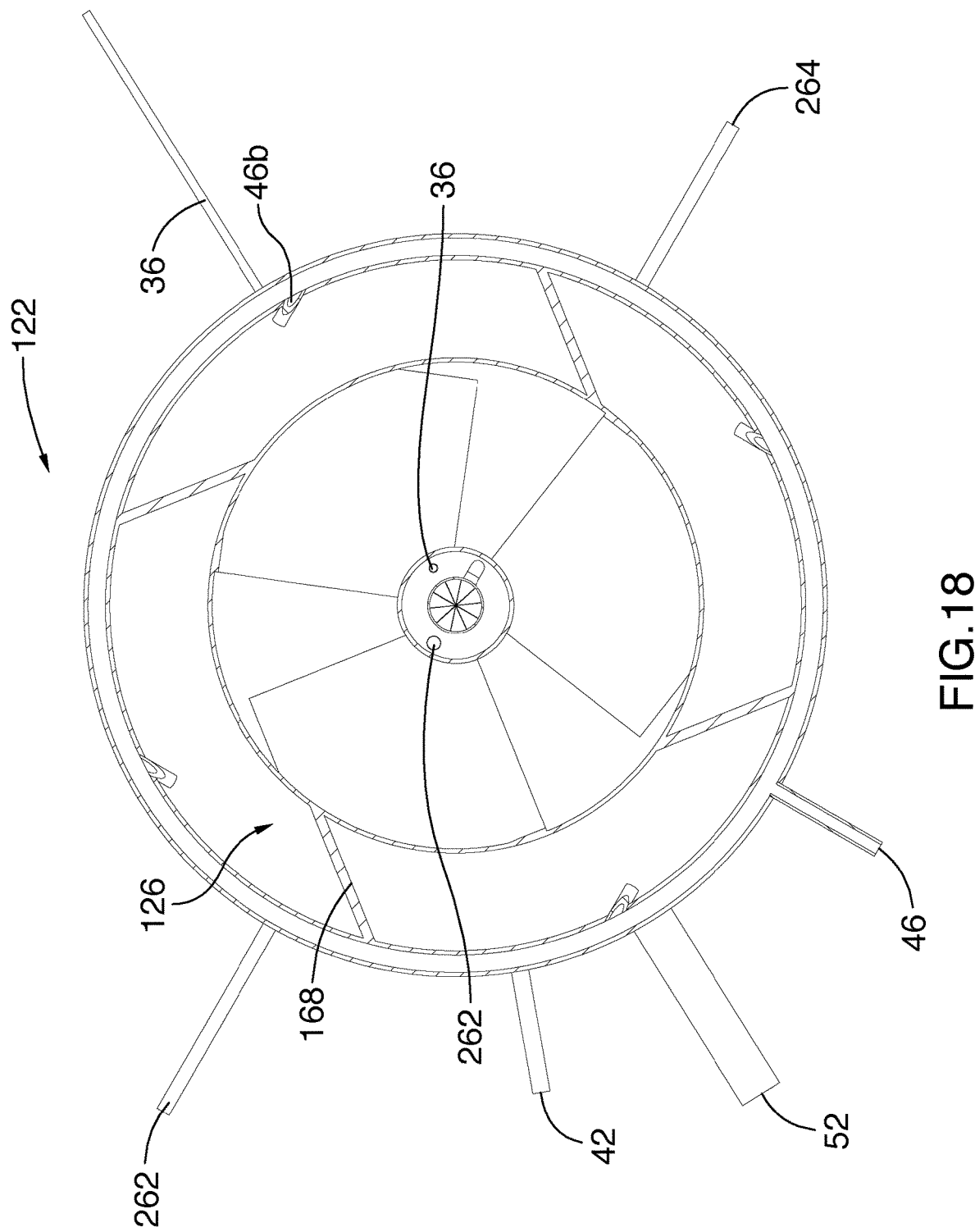
FIG. 18 is a cross sectional view along the line 18-18 of FIG. 16.
Figure 19:
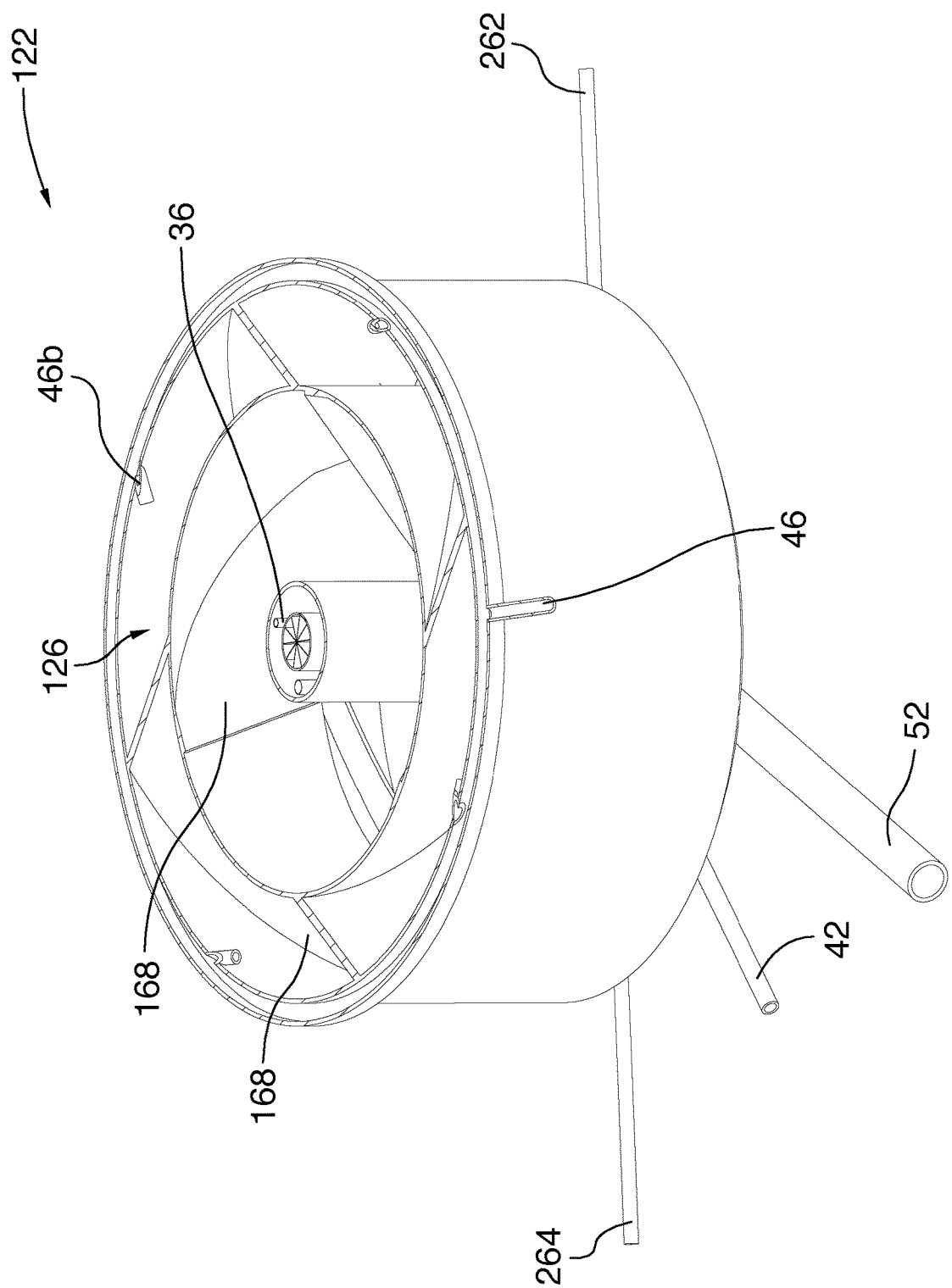
FIG. 19 is a perspective of the reaction vessel of FIG. 18.
Figure 20:
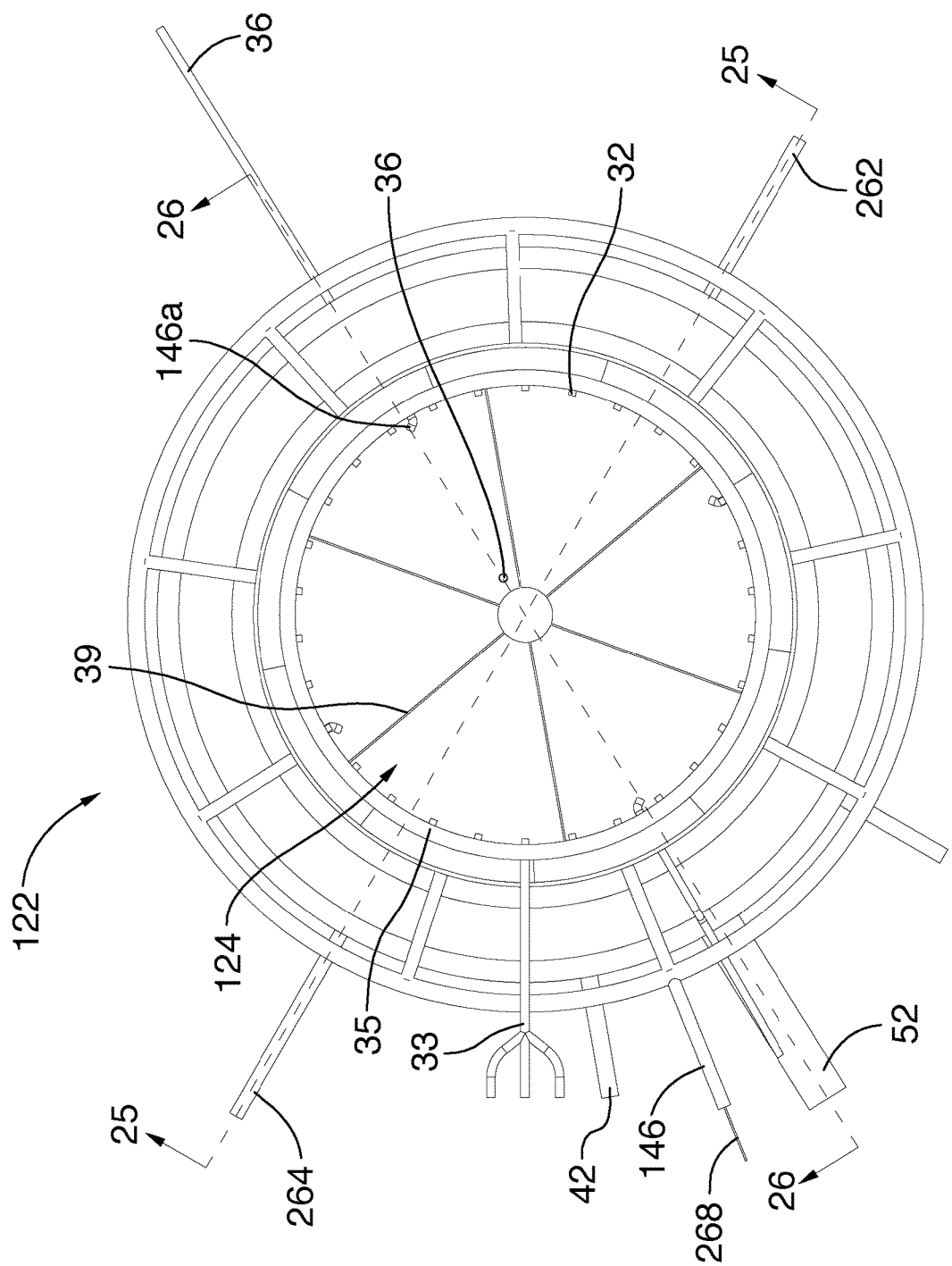
FIG. 20 is a cross sectional view along the line 20-20 of FIG. 16.
Figure 21:
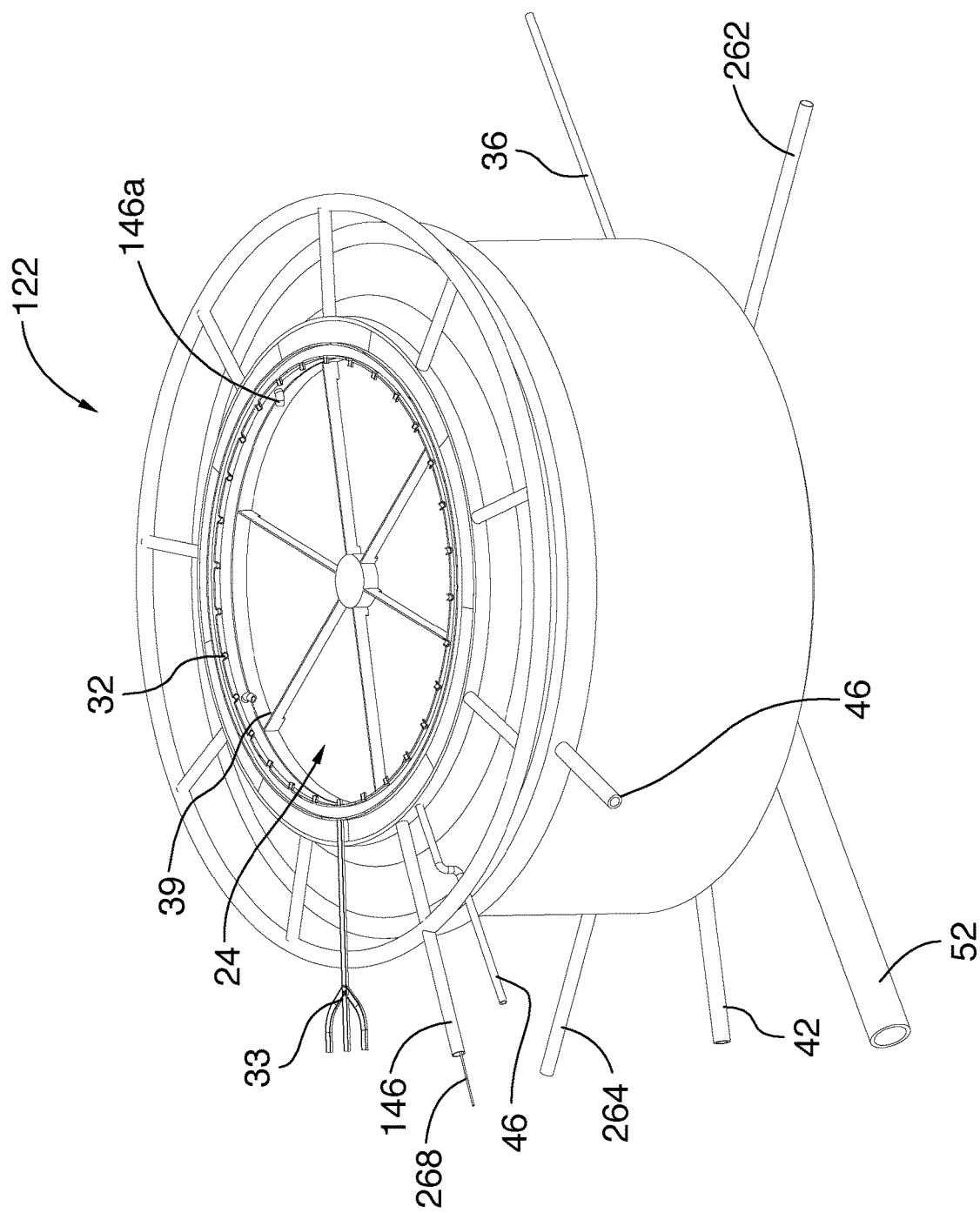
FIG. 21 is a perspective of the reaction vessel of FIG. 20.
Figure 22:
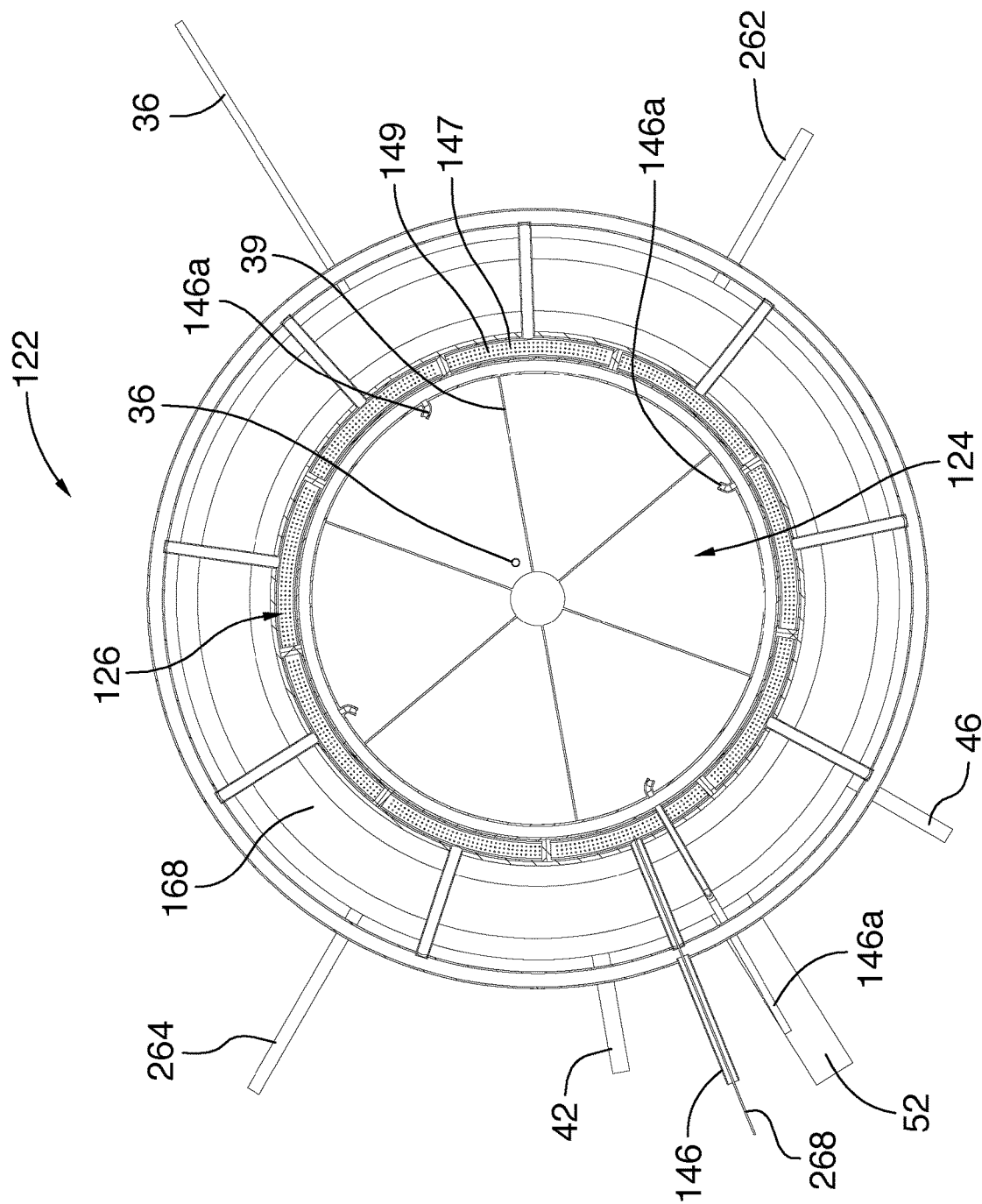
FIG. 22 is a cross sectional view along the line 22-22 of FIG. 16.
Figure 23:
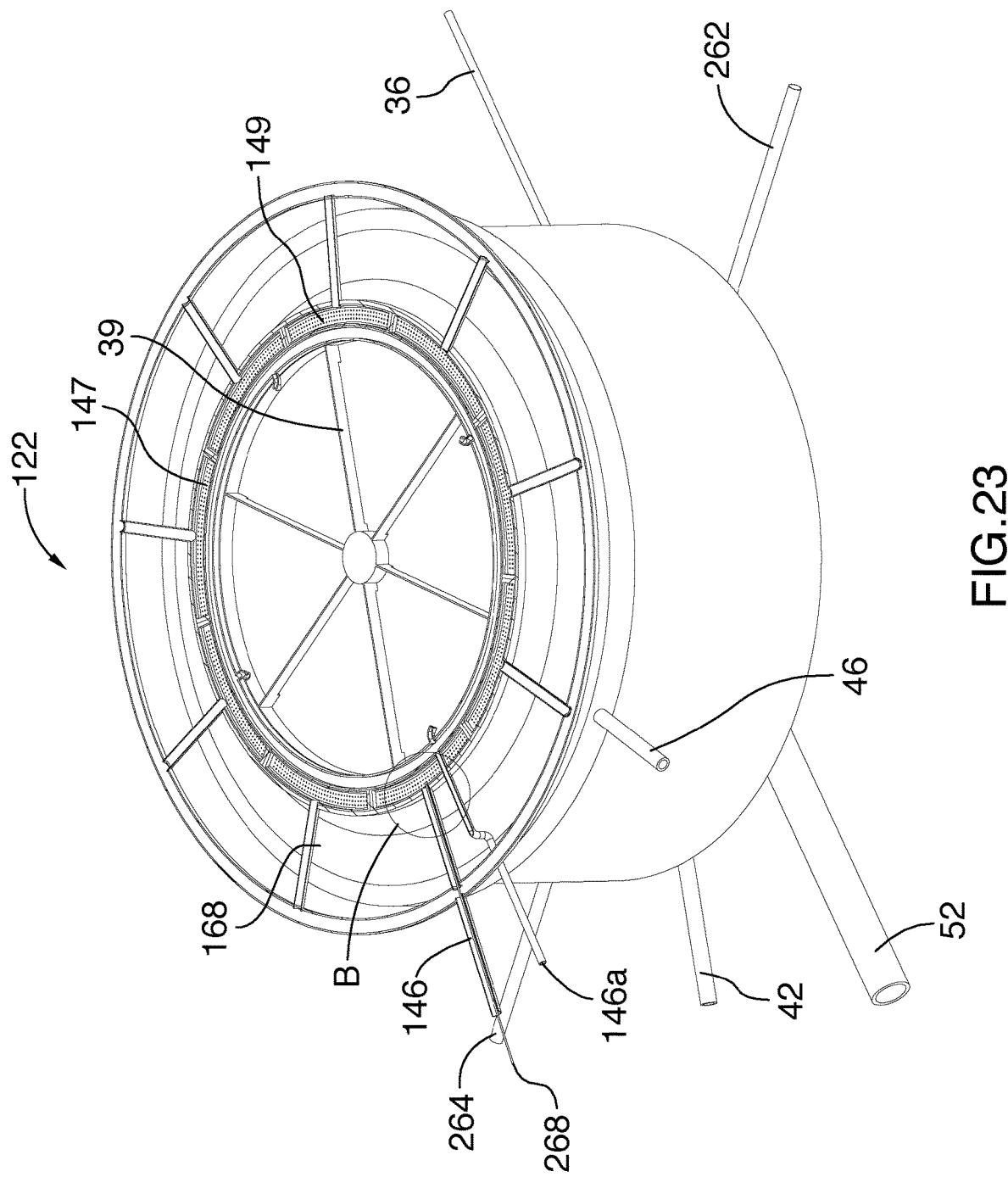
FIG. 23 is a perspective of the reaction vessel of FIG. 22.
Figure 24:
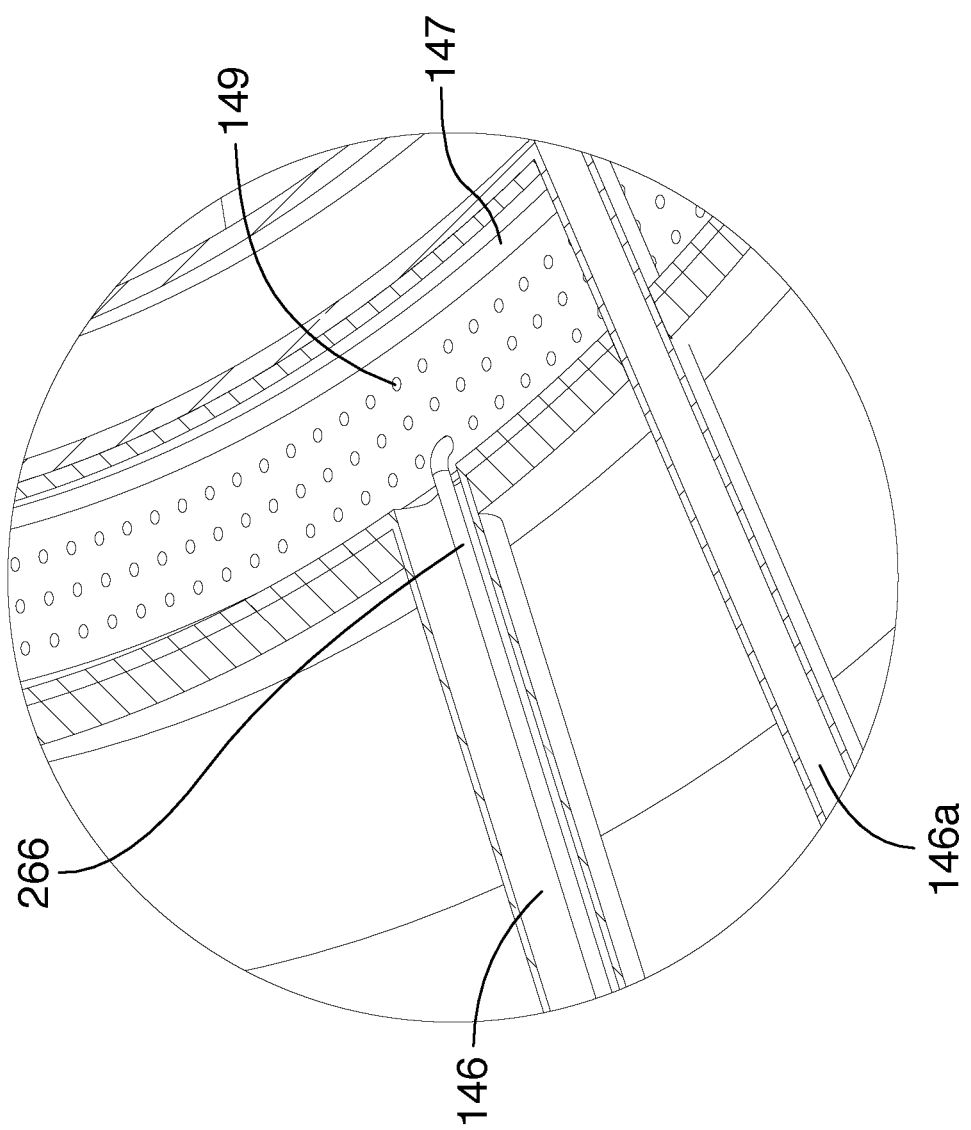
FIG. 24 is an enlarged of detail B of FIG. 23.
Figure 25:
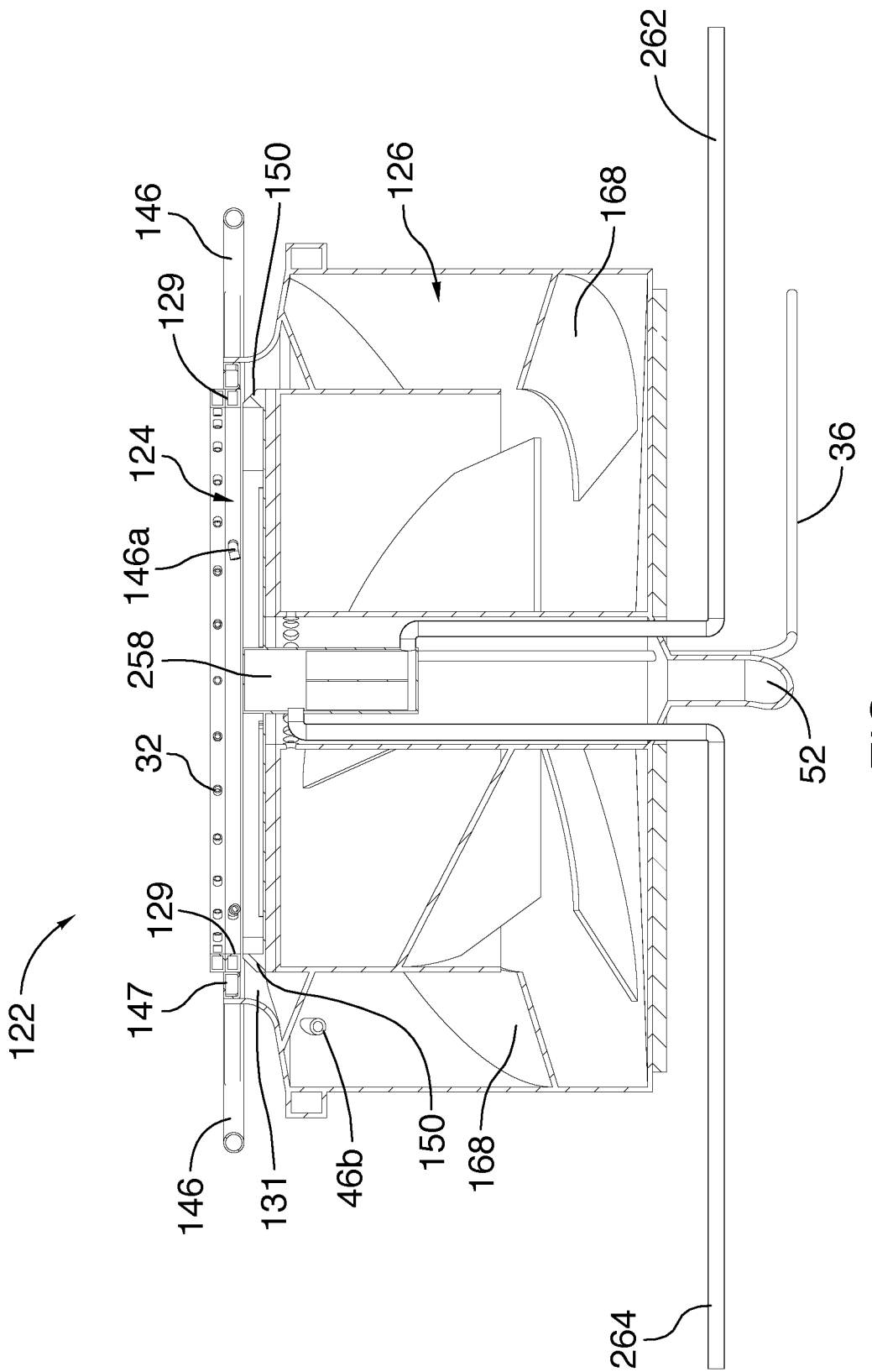
FIG. 25 is a cross sectional view along the line 25-25 of FIG. 20.
Figure 26:
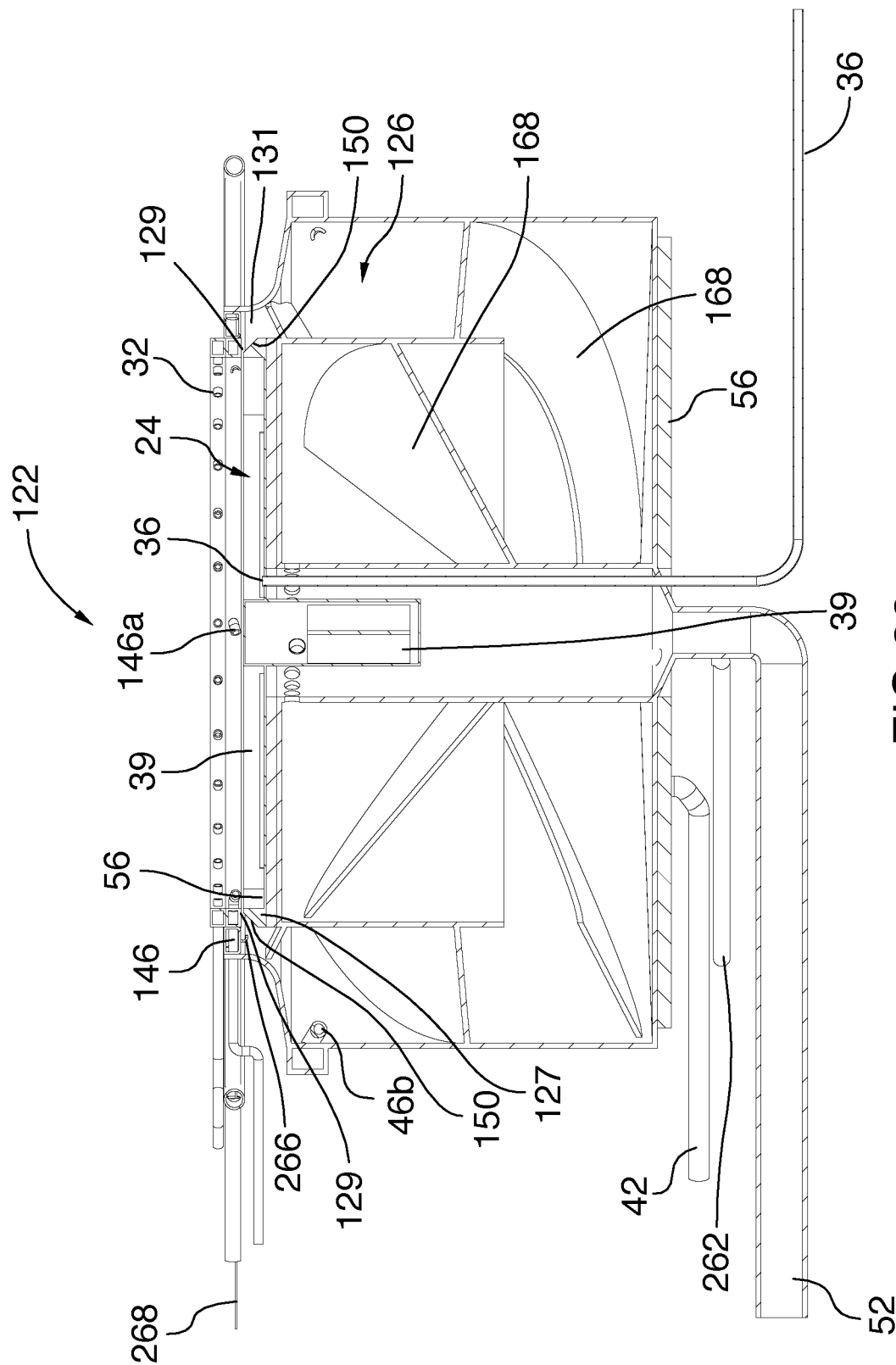
FIG. 26 is a cross sectional view along the line 26-26 of FIG. 20.

According to an embodiment, the channel 129 is an annular channel 129 which substantially encircles the first section 124. As shown in FIG. 17, there may be an expansion of the flow area which comprises an angled slope 150 formed from the wall 127 terminating at side 127b. Proximal to where holes 149 are located, the flow area for the vapor from the first section 124 plus process gas 50 can be about 14 times larger than where the vapor first starts flowing out of the first section 124 and into channel 129 from the side 127a. The flow area increases because both the diameter of the annulus and the vertical extent of the annulus are increasing, based on the geometry. The reduction process can be expected to begin in region 131, and therefore this is where the temperature of the mixture of the vapor and process gas 50 will begin to increase causing expansion. The expansion is accommodated by the increasing area (and volume) due to the increasing radius and geometry of the annulus, that the gases are being sucked through by the vacuum system pulling the products out of second vacuum outlet 52 further along the second section 126.

According to an embodiment, the annular channel 129 is configured to allow unobstructed outward radial flow of gaseous $SiO_2$ 16 from the first section 124 to the second section 126.

In an embodiment where the cooled process gas 50 is cooled $H_2$, the produced $H_2O$ vapor exhaust temperature can be expected to be about 1660 degrees C.

Furthermore, the reduction reactions in the area of the mixing region 131 can be facilitated with additional activation energy in the form of a plasma arc from electrodes 266 and wires 268 for providing current to the electrodes 266 routed into the second section 126 through the gas inlets 146. In one embodiment, the electrodes 266 are configured to deliver an ionization current into the mixing region 131 where the process gas 50 enters into the second section 126.

As shown in FIGS. 11 to 26, inert gas 48 can be introduced directly into the first section 124 through a plurality of gas inlets 146a situated along a perimeter of the first section 124. Each of the plurality of gas inlets 146a can be angled to direct the stream of inert gas 48 downward and towards the surface of any liquids present in the first section 124. The introduction of the inert gas 48 in the first section 124 may promote the vaporization process and may facilitate the movement of gaseous $SiO_2$ from the first section 124 where the evaporation is carried out towards the second section 126 where the reduction reactions are carried out.

In some embodiments, the heating vessel 58 is a combustion chamber 258 comprising one or more inlets 262 for receiving a fuel 300 and an oxidant 302 and one or more outlets 264 for removing combustion products 304. In one embodiment, the fuel 300 is $H_2$ (which can be from unused process gas 50 that is re-injected into the system 1000 or from an entirely new source) can be drawn into the combustion chamber 258 and combined with externally supplied oxidant 302 such as air or oxygen for combustion. The heat 59 produced can be used to heat the first section 24 and/or 124 and decrease the electrical energy requirements in the supply of heat required to evaporate the liquid $SiO_2$ 14 into gaseous $SiO_2$ 16 in the first section 24 and/or 124. In other embodiments, the heating vessel 58 can be used as a recuperator without combustion by routing the high temperature process gas (e.g. Hydrogen), and if additional heat is required, an oxidizer can be added to supplement this heat as required.

In some embodiments, first sections 24 and 124 and second sections 26 and 126 can further comprise an evaporation element (not shown) configured to promote depth to surface wise circulation and evaporization of one of more gases from the liquid melt collected at the bottom of one or more of sections 24, 26, 124, and 126. For example, a liquid depth of about 10 cm of $SiO_2$ may result in a hydrostatic pressure at the bottom first section 24 and 124 of about 2040 Pa more than the surface pressure.

In some embodiments, evaporation element comprises one or more injection ports (not shown) configured for introducing one or more gases directly into the liquid melt.

The one or more injection ports can be part of a manifold (not shown) situated on the bottom of one or more of sections 24, 26, 124, and 126, wherein the injection ports are configured to project one or more gases upwards and into the liquid melt. In some embodiments, the bubbling of the liquid melt in first sections 24 and 124 that occurs after the one or more gases (e.g. inert gas or any other gas) are projected from out the one or more injection ports promote surface exposure of one or more higher vapor pressure contaminants 34 which may be found in the $SiO_2$-containing material 12. In other embodiments, the bubbling of the liquid melt in second sections 26 and 126 can be done using process gas (e.g. $H_2$) and/or inert gas (e.g. Ar) to promote evaporation and reactions with any unreacted SiO deposits (which can be solid deposits) or $SiO_2$ which may have collected in the liquid Si melt at the bottom of second sections 26 and 126.

In some other embodiments, evaporation element comprises a stirring member for mechanically stirring the liquid melt collected at the bottom of one or more of sections 24, 26, 124, and 126.

In some other embodiments, the evaporation can be promoted by electromagnetic stirring. For example, when the liquid melt at the bottom of one or more of sections 24, 26, 124, and 126 contains liquid metallic contaminants, these liquid metallic contaminants can act as the conductive medium to effect an eddy current stirring action.

According to another embodiment, one or more cooling elements (not shown) may be used to lower the temperature of the second sections 26 and 126 and recapture any heat and direct this heat into the first sections 24 and 124, respectively, to promote the evaporation step in these sections. For example, the cooling elements can comprise cooling coils (not shown) and liquid coolant (not shown) circulating through the cooling coils.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the disclosure. The subject matter described herein and in the recited claims intends to cover and embrace all suitable changes in technology.

ITEMS

10 Vacuum furnace
11 System
12 $SiO_2$-containing material
14 Liquid $SiO_2$
16 Gaseous $SiO_2$
18 Si
20 Chamber
22 Reaction vessel
24 First section
26 Second section
28 Opening
30 Exhaust port
32 First section vacuum outlet
33 Splitter
34 Gaseous contaminants
35 Manifold
36 Drain
38 Contaminants
39 Heating blades
40 Opening
42 Si product tap
44 Re-charge ports
46 Gas inlets
46a Gas inlet
46b Gas inlet
48 Inert gas
50 Process gas or plasma
52 Second vacuum outlet
54 Byproducts
56 Heat source
58 Heating vessel
59 Heat
100 Process
110 Vacuum furnace
122 Reaction vessel
124 First section
126 Second section
127 Wall
127a First section facing side
127b Second section facing side
129 Channel
131 Mixing region
146 Gas inlet
146a Gas inlet
147 Gas inlet chamber
149 Holes
150 Slope
158 Heat recuperation chamber
160 Hollow body
162 Receiving end
164 Discharge end
168 Vanes
170 Oxygen or Air
172 Processing module
173 $H_2O$
174 Unreacted gases
176 Separator module
178 Cooling module
180 Carbon
182 Reaction vessel
258 Combustion chamber
260 Hollow body
262 Inlet
264 Outlet
266 Electrode
268 Wire
300 Fuel
302 Oxidant
1000 System
1100 Process

The invention claimed is:

1. A method for producing silicon from a silicon dioxide ($SiO_2$)-containing material that includes solid $SiO_2$ using a reaction vessel, the reaction vessel comprising a first section and a second section in fluid communication with said first section, the method comprising:

heating the $SiO_2$-containing material that includes the solid $SiO_2$ to a $SiO_2$-containing material that includes liquid $SiO_2$, at a sufficient temperature to convert the solid $SiO_2$ into the liquid $SiO_2$;

converting, in the first section, the liquid $SiO_2$ into gaseous $SiO_2$ that flows to the second section by reducing the pressure in the reaction vessel to a subatmospheric pressure; and reducing, in the second section, the gaseous $SiO_2$ into liquid silicon.

2. The method of claim 1, wherein the heating of the $SiO_2$-containing material that contains the solid $SiO_2$ is performed in another section, the method further comprising:

receiving, in the first section, the $SiO_2$-containing material that contains the liquid $SiO_2$ from the another section.

3. The method of claim 1, wherein the heating of the $SiO_2$-containing material that contains the solid $SiO_2$ is performed in the first section.

4. The method of claim 1, wherein the heating of the $SiO_2$-containing material that includes the solid $SiO_2$ is done in the presence of an inert gas.

5. The method of claim 4, wherein the inert gas is Argon (Ar).

6. The method of claim 1, wherein the reducing of the pressure to the subatmospheric pressure is performed over a continuous range of one or more interim pressures sufficient to evaporate one or more contaminants from the $SiO_2$-containing material that contains the liquid $SiO_2$ to one or more gaseous contaminants, the method further comprising:

removing, by vacuum, the one or more gaseous contaminants evaporated from the $SiO_2$-containing material that contains the liquid $SiO_2$ due to the one or more interim pressures, prior to the pressure reaching the subatmospheric pressure that converts the liquid $SiO_2$ into the gaseous $SiO_2$.

7. The method of claim 6, wherein the one or more gaseous contaminants is phosphorous (P), zinc (Zn), sodium (Na), calcium (Ca), antimony (Sb), lead (Pb) indium (In), manganese (Mg), gallium (Ga), or combinations thereof.

8. The method of claim 6, wherein the method further comprises:

removing, after the converting to the gaseous $SiO_2$, one or more un-evaporated contaminants remaining in the first section.

9. The method of claim 8, wherein the one or more un-evaporated contaminants is aluminum (Al), tin (Sn), copper (Cu), iron (Fe), titanium (Ti), boron (B), or combinations thereof.

10. The method of claim 1, wherein the sufficient temperature is above the melting point and below the boiling point of $SiO_2$ at atmospheric pressure.

11. The method of claim 10, wherein the sufficient temperature is from about 1983K to about 2500K.

12. The method of claim 10, wherein the sufficient temperature is on or about 2100K.

13. The method of claim 1, wherein:

at least one vane in the second section induces a circumferential flow of gases in the second section so as to cause an extension of residency time of said reducing the gaseous $SiO_2$ into the liquid silicon.

14. The method of claim 1, wherein the heating is performed by using heat stored in a gaseous byproduct that is formed in the reducing of the gaseous $SiO_2$ into the liquid silicon.

15. The method of claim 14, wherein the reaction vessel further includes a heat recuperation chamber operably connected to the second section, and wherein the method further comprises:

drawing one or more gases including the gaseous byproduct from the second section into the heat recuperation chamber, wherein heat stored in the drawn gases is directed to the $SiO_2$-containing material that includes the solid $SiO_2$ for said heating of the $SiO_2$-containing material that includes the solid $SiO_2$.

16. The method of claim 14, wherein the gaseous byproduct is $H_2O$ vapor.

17. The method of claim 1, wherein the reaction vessel further comprises a heating vessel to provide direct heat energy from a heated gas contained therein to heat the $SiO_2$-containing material containing the solid $SiO_2$.

18. The method of claim 17, wherein the heating vessel comprises:

one or more inlets for receiving a fuel and an oxidant for a combustion reaction in the heating vessel; and one or more outlets for removing combustion products from the heating vessel.

19. The method of claim 18, wherein the fuel is hydrogen ($H_2$) and the oxidant is air or oxygen ($O_2$).

20. The method of claim 1, wherein the method further comprises:

heating any liquid $SiO_2$ that may have condensed in the second section to a second temperature to convert the liquid $SiO_2$ back into re-evaporated gaseous $SiO_2$, wherein the second temperature is greater than the sufficient temperature; and reducing, in the second section, the re-evaporated gaseous $SiO_2$ into the liquid silicon.

21. The method of claim 1, wherein the method further comprises:

heating any SiO that has collected in the second section to a temperature to convert the SiO into gaseous SiO;

reducing, in the second section, the gaseous SiO into the liquid silicon and/or removing, by vacuum, any unreacted gaseous SiO from the second section.

22. The method of claim 20, wherein the method further comprises:

directing a gas into contents collected in the second section to promote evaporation of the contents.

23. The method of claim 22, wherein the gas is inert gas, carbon monoxide (CO) or hydrogen ($H_2$).

24. The method of claim 1, wherein the reducing of the gaseous $SiO_2$ into the liquid silicon is done with a process gas or plasma.

25. The method of claim 24, wherein the temperature of the process gas or plasma is less than the temperature of the gaseous $SiO_2$.

26. The method of claim 25, wherein the temperature of the process gas or plasma is on or about 300K.

27. The method of claim 24, wherein the amount of process gas or plasma is greater than stoichiometric value.

28. The method of claim 24, wherein the amount of process gas or plasma is about 7 times stoichiometric value or more.

29. The method of claim 24, wherein the process gas or plasma is carbon monoxide (CO) or hydrogen ($H_2$).

30. The method of claim 1, wherein the heating the $SiO_2$-containing material that includes the solid $SiO_2$ is performed at atmospheric pressure or greater than atmospheric pressure.

31. The method of claim 1, wherein the heating of the SiO$_2$-containing material that includes the solid SiO$_2$ is a non-reactive heating.

32. The method of claim 31, wherein the non-reactive heating is facilitated by evacuating gas contaminants surrounding of the SiO$_2$-containing material by vacuum.

33. The method of claim 1, wherein the heating of the SiO$_2$-containing material that includes the solid SiO$_2$ is performed in the absence of carbon (C) or carbon based gas.

34. The method of claim 1, wherein the SiO$_2$-containing material that includes the solid SiO$_2$ further includes one or more contaminants.

35. The method of claim 1, wherein the reducing of the pressure is performed in the first section at the sufficient temperature.

36. The method of claim 1, wherein the reducing, in the second section, is done at the subatmospheric pressure.

37. The method of claim 1, wherein the subatmospheric pressure is from about 3500 Pa to about 4000 Pa.

38. The method of claim 1, wherein the subatmospheric pressure is on or about 3500 Pa.

39. The method of claim 1, wherein the method further comprises drawing heat away from the second section and directing the heat towards the first section.

40. The method of claim 1, wherein the first section and the second section are in a co-axial arrangement, wherein the second section substantially surrounds the first section or the first section is positioned over a part of the second section.

* * * * *